(12) United States Patent
Minato et al.

(10) Patent No.: US 10,889,224 B2
(45) Date of Patent: Jan. 12, 2021

(54) VEHICLE SEAT CONTROL SYSTEM, VEHICLE SEAT CONTROL METHOD, AND STORAGE MEDIUM

(71) Applicant: HONDA MOTOR CO., LTD., Tokyo (JP)

(72) Inventors: Muneatsu Minato, Utsunomiya (JP); Hajime Ishihara, Utsunomiya (JP); Kenta Hirayama, Shioya-gun (JP); Manabu Matsumoto, Utsunomiya (JP); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 408 days.

(21) Appl. No.: 15/886,866

(22) Filed: Feb. 2, 2018

(65) Prior Publication Data

US 2018/0229638 A1 Aug. 16, 2018

(30) Foreign Application Priority Data

Feb. 10, 2017 (JP) .................................. 2017-023192

(51) Int. Cl.
*B60N 3/06* (2006.01)
*B60N 2/90* (2018.01)
(Continued)

(52) U.S. Cl.
CPC ............... *B60N 3/063* (2013.01); *B60N 2/22* (2013.01); *B60N 2/914* (2018.02); *B60N 2/995* (2018.02);
(Continued)

(58) Field of Classification Search
CPC ........ B60N 3/063; B60N 2/914; B60N 2/938; B60N 2/829; B60N 3/101; B60N 2/62;
(Continued)

(56) References Cited

U.S. PATENT DOCUMENTS 1,951,793 A * 3/1934 Herman ................. A47C 1/035
297/68
2,174,622 A * 10/1939 Dale .................... B64D 11/064
297/423.22
(Continued)

FOREIGN PATENT DOCUMENTS

CN 202234113 5/2012
CN 105579321 5/2016
(Continued)

OTHER PUBLICATIONS

Chinese Notice of Allowance for Chinese Patent Application No. 2018101040095 dated Feb. 3, 2020.
(Continued)

*Primary Examiner* — Hunter B Lonsberry
*Assistant Examiner* — Luis A Martinez Borrero
(74) *Attorney, Agent, or Firm* — Amin, Turocy & Watson, LLP

(57) ABSTRACT

A vehicle seat control system (1) includes an angle detection unit (308a) that detects an angle of a connection unit (308) that rotatably connects a seat surface portion to a backrest portion (302), a frame body (311) that includes a pair of vertical frames (311a, 311b) and a horizontal frame (311c) connecting the pair of vertical frames to each other and is provided to be stored in the seat surface portion, a leg support portion (312) including a first rotation shaft (Lb) parallel to an extending direction of the horizontal frame and is provided inside the frame body to be rotatable with respect to the frame body, a driving unit (315) that is provided at a proximal end (B1) of at least one of the pair of vertical frames and rotates the frame body taken out from the seat surface portion around a second rotation shaft (La) parallel to the extending direction of the horizontal frame, and a control unit (160) that controls the driving unit on the basis
(Continued)

of a detection result of the angle detection unit at least at the time of automatic driving of the vehicle.

8 Claims, 19 Drawing Sheets

(51) Int. Cl.
*B60N 2/22* (2006.01)
*B60R 16/037* (2006.01)
*B60N 2/02* (2006.01)

(52) U.S. Cl.
CPC ..... *B60N 2002/0272* (2013.01); *B60R 16/037* (2013.01)

(58) Field of Classification Search
CPC . B60N 2/90; B60N 2/995; B60N 2/26; B60N 2/22; B60N 2002/0272; B60R 16/037
See application file for complete search history.

(56) References Cited

U.S. PATENT DOCUMENTS

| | | | | | |
|---|---|---|---|---|---|
| 2,484,803 | A * | 10/1949 | Bell | ............... | B61D 33/005 297/423.22 |
| 2,901,025 | A * | 8/1959 | Malitte | ............... | B64D 11/0638 297/423.24 |
| 3,007,738 | A * | 11/1961 | Gardel | ............... | A47C 7/506 297/423.2 |
| 3,794,381 | A * | 2/1974 | Caldemeyer | ............... | A47C 7/506 297/423.22 |
| 4,358,156 | A * | 11/1982 | Sharff | ............... | A61G 5/14 297/423.28 |
| 4,534,594 | A * | 8/1985 | Lucien | ............... | A47C 16/02 297/423.4 |
| 4,689,537 | A * | 8/1987 | Mizuta | ............... | B60N 2/0228 318/466 |
| 5,082,324 | A * | 1/1992 | Harada | ............... | A47C 1/035 297/423.33 |
| 5,098,158 | A * | 3/1992 | Palarski | ............... | A47C 1/036 297/330 |
| 5,333,818 | A * | 8/1994 | Brandt | ............... | B64D 11/06 244/118.6 |
| 5,560,681 | A * | 10/1996 | Dixon | ............... | B64D 11/0643 297/284.11 |
| 5,651,587 | A * | 7/1997 | Kodaverdian | ............... | B60N 2/0228 297/423.36 |
| 6,095,610 | A * | 8/2000 | Okajima | ............... | B60N 2/995 297/423.36 |
| 6,161,663 | A * | 12/2000 | Venetta, II | ............... | F16F 9/46 188/278 |
| 6,212,719 | B1 * | 4/2001 | Thomas | ............... | A47C 4/54 297/284.6 |
| 6,237,994 | B1 * | 5/2001 | Bentley | ............... | A47C 1/023 297/118 |
| 6,273,866 | B2 * | 8/2001 | Thomas | ............... | A47C 4/54 601/151 |
| 6,382,727 | B1 * | 5/2002 | Pickard | ............... | A47C 7/506 297/30 |
| 6,439,636 | B1 * | 8/2002 | Kuo | ............... | B60N 2/0232 296/65.01 |
| 6,494,536 | B2 * | 12/2002 | Plant | ............... | A47C 1/0352 297/284.11 |
| 6,583,596 | B2 * | 6/2003 | Nivet | ............... | B60N 2/0244 318/626 |
| 6,588,837 | B1 * | 7/2003 | Schultz | ............... | A47C 17/165 297/111 |
| 6,652,033 | B2 * | 11/2003 | Satoh | ............... | B60N 2/0292 297/423.3 |
| 6,659,562 | B2 * | 12/2003 | Uchiyama | ............... | A47C 1/0242 297/423.3 |
| 6,663,184 | B2 * | 12/2003 | Hagiike | ............... | B60N 2/0292 297/423.3 |
| 6,695,406 | B2 * | 2/2004 | Plant | ............... | B60N 2/34 297/423.26 |
| 6,752,463 | B2 * | 6/2004 | Nivet | ............... | B60N 2/0224 297/330 |
| 6,764,137 | B2 * | 7/2004 | Menard | ............... | B60N 2/0232 297/423.36 |
| 6,773,074 | B2 * | 8/2004 | Flory | ............... | B60N 2/995 297/423.34 |
| 6,783,178 | B2 * | 8/2004 | Kasahara | ............... | B64D 11/0641 297/217.3 |
| 6,805,322 | B2 * | 10/2004 | Schmidt | ............... | B60N 2/0292 244/122 R |
| 6,866,341 | B2 * | 3/2005 | Behnert | ............... | B60N 3/063 297/423.26 |
| 6,874,855 | B2 * | 4/2005 | Nivet | ............... | A47C 1/0242 297/330 |
| 6,902,238 | B1 * | 6/2005 | Abt | ............... | B60N 2/0228 297/362.13 |
| 6,916,069 | B2 * | 7/2005 | Bauer | ............... | A47C 1/0352 297/423.3 |
| 6,929,320 | B2 * | 8/2005 | Laurent | ............... | B60N 2/22 297/83 |
| 6,929,323 | B2 * | 8/2005 | Enno | ............... | B64D 11/0641 297/217.3 |
| 7,108,329 | B1 * | 9/2006 | Clough | ............... | B60N 3/063 297/423.19 |
| 7,546,215 | B2 * | 6/2009 | Muhammad | ............... | B64D 11/06 702/94 |
| 7,571,964 | B2 * | 8/2009 | Taniguchi | ............... | B60N 2/995 297/423.36 |
| 7,621,599 | B2 * | 11/2009 | Whalen | ............... | A47C 7/50 297/423.21 |
| 7,918,508 | B2 * | 4/2011 | Whalen | ............... | A47C 7/50 297/423.26 |
| 8,408,646 | B2 * | 4/2013 | Harper | ............... | B60N 2/02 297/284.11 |
| 8,444,225 | B2 * | 5/2013 | Behe | ............... | B64D 11/06 297/423.26 |
| 8,727,433 | B2 * | 5/2014 | Lawson | ............... | A47C 1/0355 297/85 M |
| 8,882,190 | B2 * | 11/2014 | Garland | ............... | A47C 1/0342 297/85 L |
| 9,155,394 | B1 * | 10/2015 | Cohen | ............... | A47C 7/506 |
| 9,357,847 | B2 * | 6/2016 | Murphy | ............... | A47C 1/034 |
| 9,481,466 | B2 * | 11/2016 | Fischer | ............... | B64D 11/064 |
| 9,499,079 | B2 * | 11/2016 | Meister | ............... | A47C 7/506 |
| 9,738,179 | B2 * | 8/2017 | Ebina | ............... | B60W 50/082 |
| 9,809,132 | B2 * | 11/2017 | Bortolon | ............... | B60N 2/99 |
| 9,868,416 | B2 * | 1/2018 | Rajasingham | ............... | B60N 2/2851 |
| 9,908,440 | B2 * | 3/2018 | Sugioka | ............... | B60Q 3/80 |
| 9,950,644 | B2 * | 4/2018 | Tominaga | ............... | B60N 2/0224 |
| 10,052,976 | B2 * | 8/2018 | Atger | ............... | B60N 2/686 |
| 10,059,455 | B2 * | 8/2018 | Pacheco | ............... | B64D 11/0643 |
| 10,065,535 | B1 * | 9/2018 | Line | ............... | B60N 2/3013 |
| 10,081,270 | B1 * | 9/2018 | Line | ............... | B60N 2/882 |
| 10,232,740 | B1 * | 3/2019 | Jaradi | ............... | B60N 2/0232 |
| 10,238,566 | B2 * | 3/2019 | Heimbrock | ............... | A61G 7/05776 |
| 10,329,020 | B2 * | 6/2019 | Smith | ............... | B60N 2/995 |
| 10,368,648 | B2 * | 8/2019 | Hoggarth | ............... | B60N 3/063 |
| 10,391,890 | B2 * | 8/2019 | Hirayama | ............... | B60N 2/0244 |
| 10,421,549 | B2 * | 9/2019 | Jakubowski | ............... | B64D 11/0643 |
| 10,479,251 | B2 * | 11/2019 | Hur | ............... | F16H 25/20 |
| 10,631,652 | B2 * | 4/2020 | Mackert | ............... | A47C 7/506 |
| 2001/0008029 | A1 * | 7/2001 | Thomas | ............... | A47C 27/10 5/713 |
| 2002/0105212 | A1 * | 8/2002 | Nivet | ............... | B60N 2/22 297/83 |
| 2002/0109389 | A1 * | 8/2002 | Satoh | ............... | B60N 2/0292 297/423.19 |
| 2002/0113477 | A1 * | 8/2002 | Uchiyama | ............... | A47C 1/0242 297/330 |
| 2004/0012231 | A1 * | 1/2004 | Hesse | ............... | A47C 1/0355 297/85 M |
| 2004/0100137 | A1 * | 5/2004 | Johnson | ............... | B64D 11/0638 297/423.26 |
| 2005/0173963 | A1 * | 8/2005 | Edrich | ............... | B60N 2/62 297/423.28 |

(56) References Cited

U.S. PATENT DOCUMENTS

| | | | |
|---|---|---|---|
| 2006/0186721 A1* | 8/2006 | Flory | B60N 3/063 297/423.36 |
| 2007/0102985 A1* | 5/2007 | Taniguchi | B60N 2/995 297/423.36 |
| 2008/0012414 A1* | 1/2008 | Dewert | A47C 1/0342 297/354.11 |
| 2008/0272629 A1* | 11/2008 | Walkingshaw | A61G 5/085 297/118 |
| 2008/0272637 A1* | 11/2008 | Czinki | B60N 2/0224 297/301.5 |
| 2009/0088930 A1* | 4/2009 | Ohtsubo | B60N 2/067 701/49 |
| 2009/0289477 A1* | 11/2009 | Mackert | A47C 1/0352 297/75 |
| 2009/0302632 A1* | 12/2009 | Kuno | B60N 2/3031 296/65.09 |
| 2010/0052396 A1* | 3/2010 | Whalen | B60N 2/90 297/423.21 |
| 2010/0102612 A1* | 4/2010 | Walters | A47C 7/506 297/354.1 |
| 2010/0244534 A1* | 9/2010 | Driessen | B64D 11/0649 297/423.35 |
| 2010/0276973 A1* | 11/2010 | Zenk | B60N 2/914 297/284.3 |
| 2011/0025113 A1* | 2/2011 | Thoreux | B64D 11/064 297/330 |
| 2011/0240797 A1* | 10/2011 | Behe | B64D 11/06 244/122 R |
| 2011/0285186 A1* | 11/2011 | Demmelmeier | B60N 2/0248 297/217.1 |
| 2012/0228919 A1* | 9/2012 | Dowty | B64D 11/064 297/85 M |
| 2012/0286544 A1* | 11/2012 | Cohen | A47C 4/46 297/30 |
| 2013/0054279 A1* | 2/2013 | Sharp | G06Q 10/02 705/5 |
| 2013/0099543 A1* | 4/2013 | An | A47C 7/5062 297/354.1 |
| 2013/0175838 A1* | 7/2013 | Oshima | B60N 2/4263 297/284.3 |
| 2013/0175847 A1* | 7/2013 | Lawson | A61G 5/14 297/85 M |
| 2014/0077560 A1* | 3/2014 | Hirao | B60N 2/2222 297/354.11 |
| 2014/0300147 A1* | 10/2014 | Suhre | B60N 2/77 297/170 |
| 2015/0084394 A1* | 3/2015 | Hempstead | A47C 7/506 297/423.39 |
| 2015/0375865 A1* | 12/2015 | Fischer | B60N 2/77 701/49 |
| 2016/0016667 A1* | 1/2016 | Schmidt-Schaffer | B64D 11/0643 244/118.6 |
| 2016/0075260 A1* | 3/2016 | Atger | B60N 2/22 297/354.12 |
| 2016/0082867 A1* | 3/2016 | Sugioka | B60N 2/06 701/49 |
| 2016/0159251 A1* | 6/2016 | Ebina | B60N 2/0248 701/49 |
| 2016/0288673 A1* | 10/2016 | Vyskocil | B60N 2/0232 |
| 2017/0101032 A1* | 4/2017 | Sugioka | B60Q 3/80 |
| 2017/0217335 A1* | 8/2017 | Tominaga | B60N 2/0248 |
| 2017/0318971 A1* | 11/2017 | Kim | A47C 7/5068 |
| 2018/0029501 A1* | 2/2018 | Wolf | B60R 22/48 |
| 2018/0105076 A1* | 4/2018 | Dry | B60N 2/164 |
| 2018/0105080 A1* | 4/2018 | Dry | B60N 2/914 |
| 2018/0162534 A1* | 6/2018 | Jakubowski | B64D 11/0647 |
| 2018/0170551 A1* | 6/2018 | Newell | B60N 3/063 |
| 2018/0222350 A1* | 8/2018 | Hirayama | B60N 2/0244 |
| 2018/0229740 A1* | 8/2018 | Matsumoto | B60W 30/12 |
| 2019/0118676 A1* | 4/2019 | Koh | B60N 2/20 |
| 2019/0168644 A1* | 6/2019 | Kim | B60N 2/04 |
| 2019/0351800 A1* | 11/2019 | Seibold | B60N 2/0224 |
| 2020/0008581 A1* | 1/2020 | Jones | A47C 31/008 |
| 2020/0223342 A1* | 7/2020 | Ito | B60N 2/995 |

FOREIGN PATENT DOCUMENTS

| | | | |
|---|---|---|---|
| DE | 202006005981 | 6/2006 | |
| IT | 2 465 384 B1 * | 7/2011 | A47C 1/024 |
| JP | 60-036339 | 3/1985 | |
| JP | 4-092445 | 8/1992 | |
| JP | 10-229931 | 9/1998 | |
| JP | 2000-023782 | 1/2000 | |
| JP | 3086785 | 7/2000 | |
| JP | 2002-238695 | 8/2002 | |
| JP | 2002-248971 | 9/2002 | |
| JP | 2013-244244 | 12/2013 | |
| JP | 2016-120174 | 7/2016 | |
| KR | 10-2014-0032172 | 3/2014 | |

OTHER PUBLICATIONS

Japanese Notice of Allowance for Japanese Patent Application No. 2017-023192 dated Sep. 18, 2018.

* cited by examiner

VEHICLE SEAT CONTROL SYSTEM, VEHICLE SEAT CONTROL METHOD, AND STORAGE MEDIUM

CROSS-REFERENCE TO RELATED APPLICATION

Priority is claimed on Japanese Patent Application No. 2017-023192 filed Feb. 10, 2017, the content of which is incorporated herein by reference.

BACKGROUND

Field of the Invention

The present invention relates to a vehicle seat control system, a vehicle seat control method, and a storage medium.

Description of Related Art

In the related art, there is a vehicle seat in which a footrest is provided for comfortable seating of an occupant. Japanese Unexamined Patent Application, First Publication No. 2000-23782 describes a footrest that can be loaded or unloaded onto or from a seating portion of a seat. This footrest includes a movable base that can be loaded or unloaded onto or from the seating portion, and a footrest member that is rotatably pivoted on the base.

SUMMARY

In recent years, implementation of automatic driving has been under way. Accordingly, technologies for controlling functions of a seat on which an occupant is seated on the basis of a traveling state of a vehicle have been under research. When the vehicle is in an automatic driving mode, an occupant may take a relaxing posture using a footrest or the like from the seat. However, in the related art, maintaining a relaxing posture of the occupant by controlling the footrest according to a change in a driving mode of the vehicle has not been performed.

The present invention has been made in consideration of such circumstances, and an object of the present invention is to provide a vehicle seat control system, a vehicle seat control method, and a storage medium capable of performing control for supporting leg portions of an occupant according to a traveling state of a vehicle.

A vehicle seat control system, a vehicle seat control method, and a storage medium according to the present invention adopt the following configurations.

(1) A vehicle seat control system according to an aspect of the present invention is a vehicle seat control system including: an angle detection unit that detects an angle of a connection unit that rotatably connects a seat surface portion to a backrest portion; a frame body that includes a pair of vertical frames and a horizontal frame connecting the pair of vertical frames to each other and is provided to be stored in the seat surface portion; a leg support portion that includes a first rotation shaft parallel to an extending direction of the horizontal frame and is provided inside the frame body to be rotatable with respect to the frame body; a driving unit that is provided at a proximal end of at least one of the pair of vertical frames and rotates the frame body taken out from the seat surface portion around a second rotation shaft parallel to the extending direction of the horizontal frame; and a control unit that controls the driving unit on the basis of a detection result of the angle detection unit at least at the time of automatic driving of the vehicle.

(2) In the aspect (1), the vehicle seat control system further includes: a bag body portion that is attached to any one of the inside of the frame body and a top surface of the leg support portion and is inflatable into a shape that sandwiches a leg portion of an occupant; and a pressurizing unit that inflates the bag body portion with a fluid, wherein the control unit operates the pressurizing unit at the time of automatic driving of the vehicle.

(3) In the aspect (2), the frame body is formed of a tubular member, and the fluid is flowed into the bag body portion through the inside of the tubular member.

(4) In the aspect (2), the control unit changes a control aspect of the pressurizing unit on the basis of an operation of the occupant.

(5) In the aspect (2), the vehicle seat control system further includes a detection unit that detects that the frame body is loaded or unloaded onto or from the seat surface portion, wherein the control unit starts control of the driving unit and the pressurizing unit on the basis of a detection result of the detection unit.

(6) In the aspect (2), the vehicle seat control system further includes: a heat source unit that changes a temperature in the bag body portion, wherein the control unit controls the heat source unit on the basis of an operation of an occupant to change the temperature in the bag body portion.

(7) A method of controlling a vehicle seat according to an aspect of the present invention is a method of controlling a vehicle seat including a frame body that includes a pair of vertical frames and a horizontal frame connecting the pair of vertical frames to each other and is provided to be stored in a seat surface portion, a leg support portion including a first rotation shaft parallel to an extending direction of the horizontal frame and provided inside the frame body to be rotatable with respect to the frame body, and a driving unit that is provided at a proximal end of at least one of the pair of vertical frames and rotates the frame body taken out from the seat surface portion around a second rotation shaft parallel to the extending direction of the horizontal frame, the method using an in-vehicle computer, comprising: detect an angle of a connection unit that rotatably connects the seat surface portion to a backrest portion; and control the driving unit on the basis of a detection result at least at the time of automatic driving of the vehicle.

(8) A non-transitory computer-readable recording medium recording a vehicle seat control program causing an in-vehicle computer to, the vehicle seat including a frame body that includes a pair of vertical frames and a horizontal frame connecting the pair of vertical frames to each other and is provided to be stored in a seat surface portion, a leg support portion including a first rotation shaft parallel to an extending direction of the horizontal frame and provided inside the frame body to be rotatable with respect to the frame body, and a driving unit that is provided at a proximal end of at least one of the pair of vertical frames and rotates the frame body taken out from the seat surface portion around a second rotation shaft parallel to the extending direction of the horizontal frame, wherein: a computer detects an angle of a connection unit that rotatably connects the seat surface portion to a backrest portion; and controls the driving unit on the basis of a detection result at least at the time of automatic driving of the vehicle.

According to the aspects (1), (7), and (8), in a case that the occupant causes the seat to enter a reclining state during the automatic driving of the vehicle, it is possible to improve the comfort of the occupant by performing control regarding the footrest portion.

According to the aspect (2), the bag body provided in the footrest portion is inflated by the pressurizing unit during automatic driving of the vehicle. Thus, it is possible to cause the leg portion of the occupant to enter a pressurized state with a temporal change and it is possible to further improve the comfort of the occupant.

According to the aspect (3), since the frame body also serves as a pipe for the fluid that is used for inflation of the bag body, it is possible to simplify a device configuration.

According to the aspect (4), it is possible for an occupant to change a control aspect of the pressurizing unit through an operation, and improve the comfort of the occupant.

According to the aspect (5), since the control of the footrest portion is started after the detection unit has detected loading and unloading of the footrest portion, it is possible to improve safety of the footrest portion.

According to the aspect (6), it is possible to further improve the comfort of an occupant who uses the footrest portion by changing a temperature in the bag body.

DESCRIPTION OF EMBODIMENTS

Hereinafter, embodiments of a vehicle system, a vehicle control method, and a storage medium of the present invention will be described with reference to the drawings. The vehicle system is applied to an automatically driven vehicle. The automatic driving to be described below may include advanced driving support in which lane keeping and follow-up driving are performed in a complex manner, and may refer to automatic driving in which lane changing or branching is automatically performed, without including the advanced driving support.

First Embodiment

[Overall Structure]

Figure 1:
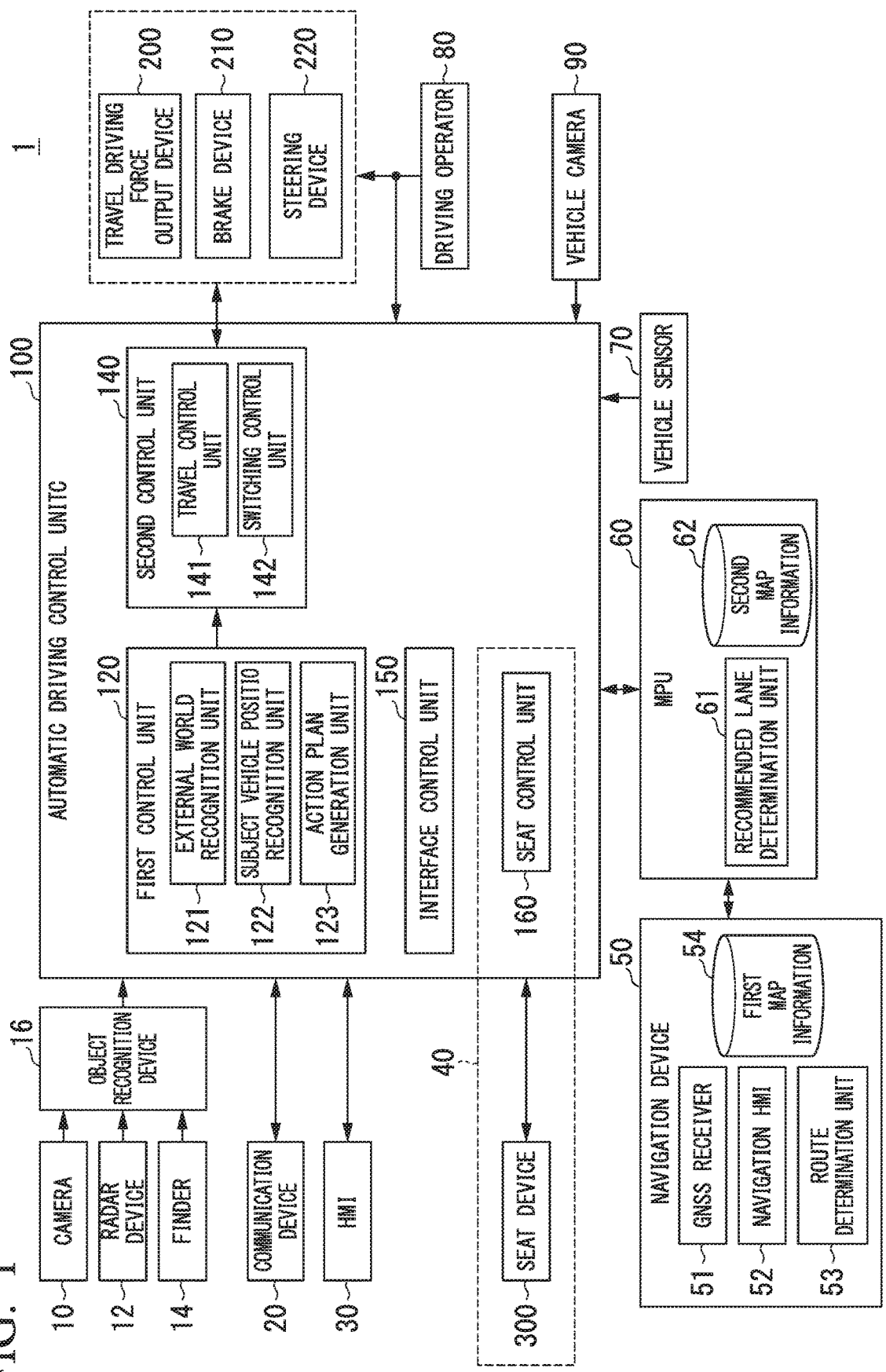
FIG. 1 is a configuration diagram of a vehicle system 1 according to a first embodiment.

FIG. 1 is a configuration diagram of a vehicle system 1 according to a first embodiment. A vehicle on which the vehicle system 1 is mounted (hereinafter referred to as a vehicle M) is, for example, a vehicle such as a two-wheeled, three-wheeled, or four-wheeled vehicle. A driving source thereof is an internal combustion engine such as a diesel engine or a gasoline engine, an electric motor, or a combination thereof. The electric motor is operated using power generated by a generator connected to the internal combustion engine, or discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, an in-vehicle camera 90, an automatic driving control unit 100, a travel driving force output device 200, a brake device 210, a steering device 220, and a seat device 300. The devices or apparatuses are connected to each other by a multiplex communication line such as a controller area network (CAN), a communication line, a serial communication line, a wireless communication network, or the like. Note that the configuration showed in FIG. 1 is merely an example. The configuration may be partially omitted or another configuration may be added.

The camera 10 is, for example, a digital camera using a solid-state imaging device such as a charge coupled device (CCD) or a complementary metal oxide semiconductor (CMOS). One or a plurality of cameras 10 are attached to arbitrary places of the vehicle M on which the vehicle system 1 is mounted. In a case in which a front side is imaged, the camera 10 is attached to an upper portion of a front windshield, a rear surface of a rearview mirror, or the like. In a case in which a rear side is imaged, the camera 10 is attached to an upper portion of a rear windshield, a back door, or the like. In a case that a side is imaged, the camera 10 is attached to a door mirror or the like. For example, the camera 10 periodically repeatedly images the periphery of the vehicle M. The camera 10 may be a stereo camera.

The radar device 12 radiates radio waves such as millimeter waves to the vicinity of the vehicle M and detects radio waves reflected by the object (reflected waves) to detect at least a position (a distance and a direction) of the object. One or a plurality of radar devices 12 are attached to arbitrary places of the vehicle M. The radar device 12 may detect a position and a speed of the object using a frequency modulated continuous wave (FMCW) scheme.

The finder 14 is a light detection and ranging or laser imaging detection and ranging (LIDAR) which measures scattered light with respect to irradiation light and detects a distance to the object. One or a plurality of finders 14 are attached to arbitrary places of the vehicle M.

The object recognition device 16 performs a sensor fusion process on detection results of some or all of the camera 10, the radar device 12, and the finder 14 to recognize a position, a type, a speed, and the like of the object. The object recognition device 16 outputs a recognition result to the automatic driving control unit 100.

The communication device 20 communicates with other vehicles near the vehicle M, for example, using a cellular network, a Wi-Fi network, Bluetooth (registered trademark), dedicated short range communication (DSRC), or the like, or communicates with various server devices via a wireless base station. The communication device 20 communicates with a terminal device possessed by a person outside the vehicle.

The HMI 30 presents various types of information to an occupant in the vehicle and receives an input operation from the occupant. Examples of the HMI 30 include various display devices, speakers, buzzers, touch panels, various operating switches, or keys.

The navigation device 50 includes, for example, a global navigation satellite system (GNSS) receiver 51, a navigation HMI 52, and a route determination unit 53, and stores first map information 54 in a storage device such as a hard disk drive (HDD) or a flash memory. The GNSS receiver specifies the position of the vehicle M on the basis of a signal received from a GNSS satellite. The position of the vehicle M may be specified or extrapolated by an inertial navigation system (INS) using an output of the vehicle sensor 70. The navigation HMI 52 includes a display device, a speaker, a touch panel, keys, or the like. The navigation HMI 52 may be partly or wholly shared with the above-described HMI 30. For example, the route determination unit 53 may determine a route to the destination input by the occupant using the navigation HMI 52 (including, for example, information on transit points at the time of traveling to the destination), from the position of the vehicle M specified by the GNSS receiver 51 (or an arbitrary input position), by referring to the first map information 54. The first map information 54 is, for example, information in which a road shape is expressed by a link indicating a road and nodes connected by a link. The first map information 54 may include a curvature of the road, point of interest (POI) information, or the like. The route determined by the route determination unit 53 is output to the MPU 60. The navigation device 50 may perform route guidance using the navigation HMI 52 on the basis of the route determined by the route determination unit 53. The navigation device 50 may be realized using a function of a terminal device such as a smartphone or a tablet terminal held by the user, for example. Further, the navigation device 50 may transmit a current position and the destination to the navigation server via the communication device 20, and acquire a route returned from the navigation server.

The MPU 60 functions as, for example, a recommended lane determination unit 61, and holds second map information 62 in the storage device such as an HDD or a flash memory. The recommended lane determination unit 61 divides the route provided from the navigation device 50 into a plurality of blocks (for example, divides the route every 100 [m] in a travel direction of the vehicle), and determines a recommended lane for each block by referring to the second map information 62. The recommended lane determination unit 61 determines which lane from the left the vehicle M travels on. The recommended lane determination unit 61 determines the recommended lane so that the vehicle M can travel on a reasonable travel route to a branch destination when there are branching points, merging points, or the like on the route.

The second map information 62 is map information with higher accuracy than the first map information 54. The second map information 62 includes, for example, information on a center of a lane or information on a boundary of a lane. Further, the second map information 62 may include road information, traffic regulation information, address information (address and postal code), facility information, telephone number information, and the like. The road information includes information indicating a type of a road, such as a highway, toll roads, national road, or prefectural road, the number of lanes of roads, an area of an emergency parking zone, a width of each lane, a gradient of a road, a position of a road (three-dimensional coordinates including longitude, latitude, and height), curvatures of curves of lanes, positions of merging and branching points of a lane, or information on signs or the like provided on a road. The second map information 62 may be updated at any time by accessing another device using the communication device 20.

The vehicle sensor 70 includes a vehicle speed sensor that detects a current speed of the vehicle M, an acceleration sensor that detects an acceleration in the travel direction of the vehicle M, a yaw rate sensor that detects an angular speed around a vertical axis, a direction sensor that detects a direction of the vehicle M, and the like. The acceleration sensor may include, for example, a lateral acceleration sensor that detects a gravitational acceleration in a lateral direction of the vehicle M (hereinafter referred to as "lateral acceleration").

The driving operator 80 includes, for example, an accelerator pedal, a brake pedal, a shift lever, a steering wheel, and other operators. A sensor that detects the amount of an operation or the presence or absence of an operation is attached to the driving operator 80, and a result of the detection is output to one or both of the automatic driving control unit 100, and the travel driving force output device 200, the brake device 210, and the steering device 220.

The in-vehicle camera 90, for example, images the interior of the vehicle M. For example, the in-vehicle camera 90 images the seat device 300 or the periphery of the seat device 300. The in-vehicle camera 90, for example, periodically repeatedly images the interior of the vehicle M. A captured image of the in-vehicle camera 90 is output to the automatic driving control unit 100.

[Automatic Driving Control Unit]

The automatic driving control unit 100 includes, for example, a first control unit 120, a second control unit 140, an interface control unit 150, a seat control unit 160, an occupant state determination unit 170, and a storage unit 180. The first control unit 120, the second control unit 140, the interface control unit 150, the seat control unit 160, and the occupant state determination unit 170, and the storage unit 180 are each realized by a processor such as a central processing unit (CPU) executing a program (software). Further, some or all of functional units of the first control unit 120, the second control unit 140, the interface control unit 150, the seat control unit 160, the occupant state determination unit 170, and the storage unit 180 to be described below may be realized by hardware such as a large scale integration (LSI), an application specific integrated circuit (ASIC), or a field-programmable gate array (FPGA), or may be realized by software and hardware in cooperation. The program may be stored in a storage device such as an HDD or a flash memory in advance, or may be stored in a detachable storage medium such as a DVD or a CD-ROM and the storage medium may be mounted on the drive device and installed in a storage device.

The first control unit 120 includes, for example, an external world recognition unit 121, a subject vehicle position recognition unit 122, and an action plan generation unit 123.

The external world recognition unit 121 recognizes a state such as a position, a speed, and an acceleration of a nearby vehicle on the basis of information input from the camera 10, the radar device 12, and the finder 14 via the object recognition device 16. The position of a nearby vehicle may be represented by a representative point such as a centroid or a corner of the nearby vehicle or may be represented by an area represented by an outline of the nearby vehicle. The "state" of a nearby vehicle may include an acceleration, a jerk, or a "state of action" (for example, whether or not the nearby vehicle is changing lane or is about to change lanes) of the nearby vehicle.

The external world recognition unit 121 may recognize a position of a guardrail, a telephone pole, a parked vehicle, a person such as a pedestrian, or other objects, in addition to a nearby vehicle.

The subject vehicle position recognition unit 122 recognizes, for example, a lane (travel lane) along which the subject vehicle M is traveling, and a relative position and posture of the subject vehicle M relative to the travel lane. The subject vehicle position recognition unit 122, for example, compares a pattern (for example, an arrangement of solid lines and broken lines) of a road partition line obtained from the second map information 62 with a pattern of a road partition line near the subject vehicle M recognized from an image captured by the camera 10 to recognize a travel lane. In this recognition, the position of the subject vehicle M acquired from the navigation device 50 or a result of a process using an INS may be taken into consideration.

Figure 2:
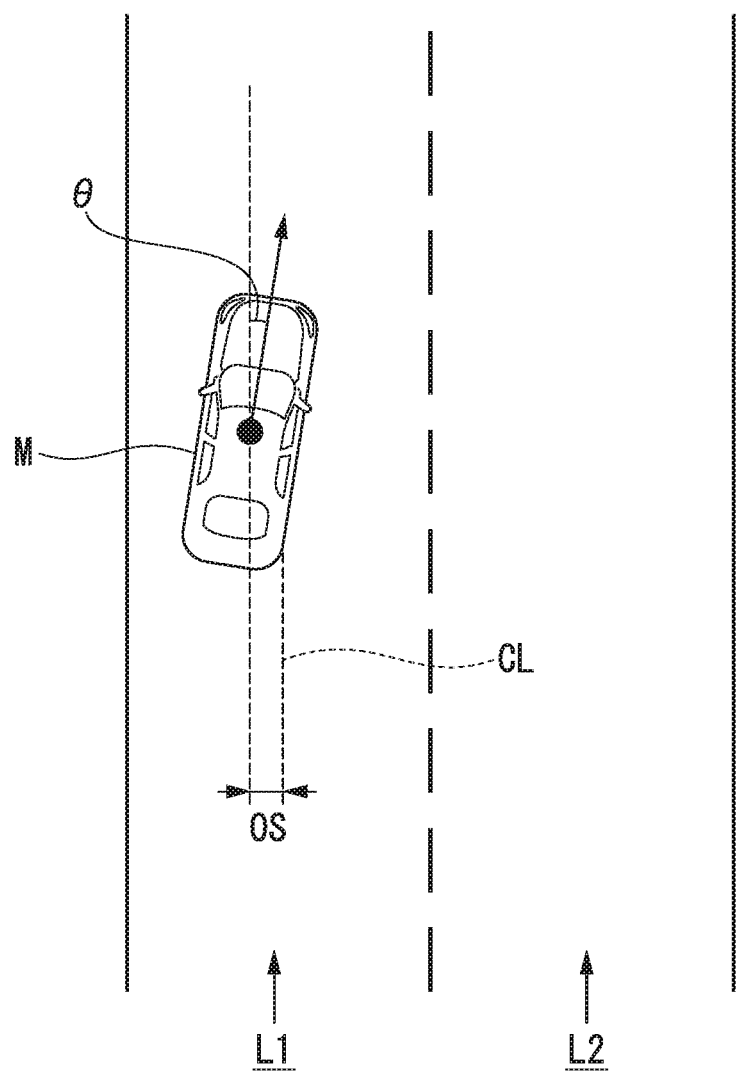
FIG. 2 is a diagram showing a state in which a relative position and a posture of a vehicle M relative to a travel lane L1 are recognized by a subject vehicle position recognition unit 122.

The subject vehicle position recognition unit 122 recognizes, for example, a position or a posture of the subject vehicle M relative to the travel lane. FIG. 2 is a diagram showing a state in which a relative position and posture of the subject vehicle M relative to the travel lane L1 are recognized by the subject vehicle position recognition unit 122. The subject vehicle position recognition unit 122, for example, recognizes a deviation OS of a reference point (for example, a centroid) of the subject vehicle M from a travel lane center CL and an angle θ of a travel direction of the subject vehicle M with respect to a line connecting the travel lane center CL as the relative position and posture of the subject vehicle M relative to the travel lane L1. Note that, alternatively, the subject vehicle position recognition unit 122 may recognize, for example, a position of the reference point of the subject vehicle M relative to any one of side end portions of the travel lane L1 as a relative position of the subject vehicle M relative to the travel lane. The relative position of the subject vehicle M recognized by the subject vehicle position recognition unit 122 is provided to the recommended lane determination unit 61 and the action plan generation unit 123.

The action plan generation unit 123 generates an action plan for the vehicle M to performing automatic driving with respect to the destination or the like. For example, the action plan generation unit 123 determines events to be sequentially executed in the automatic driving so that the vehicle M travels along a recommended lane determined by the recommended lane determination unit 61 and so that the vehicle M can cope with surrounding situations of the vehicle M. The events in the automatic driving of the first embodiment include, for example, a constant-speed traveling event in which a vehicle travels on the same travel lane at a constant speed, a lane changing event in which a travel lane of the vehicle M is changed, an overtaking event in which the vehicle M overtakes a preceding vehicle, a following traveling event in which the vehicle M travels following a vehicle, a merging event in which the vehicle M merges at a merging point, a branching event in which the vehicle M is caused to travel in a target direction at a branching point of the road, an emergency stopping event in which the vehicle M is caused to make an emergency stop, and a switching event in which automatic driving is ended and switching to manual driving is performed. An action for avoidance may be scheduled on the basis of the surrounding situation of the vehicle M (presence of nearby vehicles or pedestrians, lane narrowing due to road construction, or the like) during execution of these events.

The action plan generation unit 123 generates a target trajectory in which the subject vehicle M will travel in the future. The target trajectory is expressed by sequentially arranging points (trajectory points) that the vehicle M should reach. The trajectory point is a point that the subject vehicle M should reach at each predetermined travel distance. In addition, a target speed and a target acceleration for each predetermined sampling time (for example, about every several tenths of a [sec]) are generated as a part of the target trajectory. The trajectory point may be a position that the subject vehicle M should reach at the sampling time at each predetermined sampling time. In this case, information on the target speed and the target acceleration is represented at an interval between the trajectory points.

Figure 3:
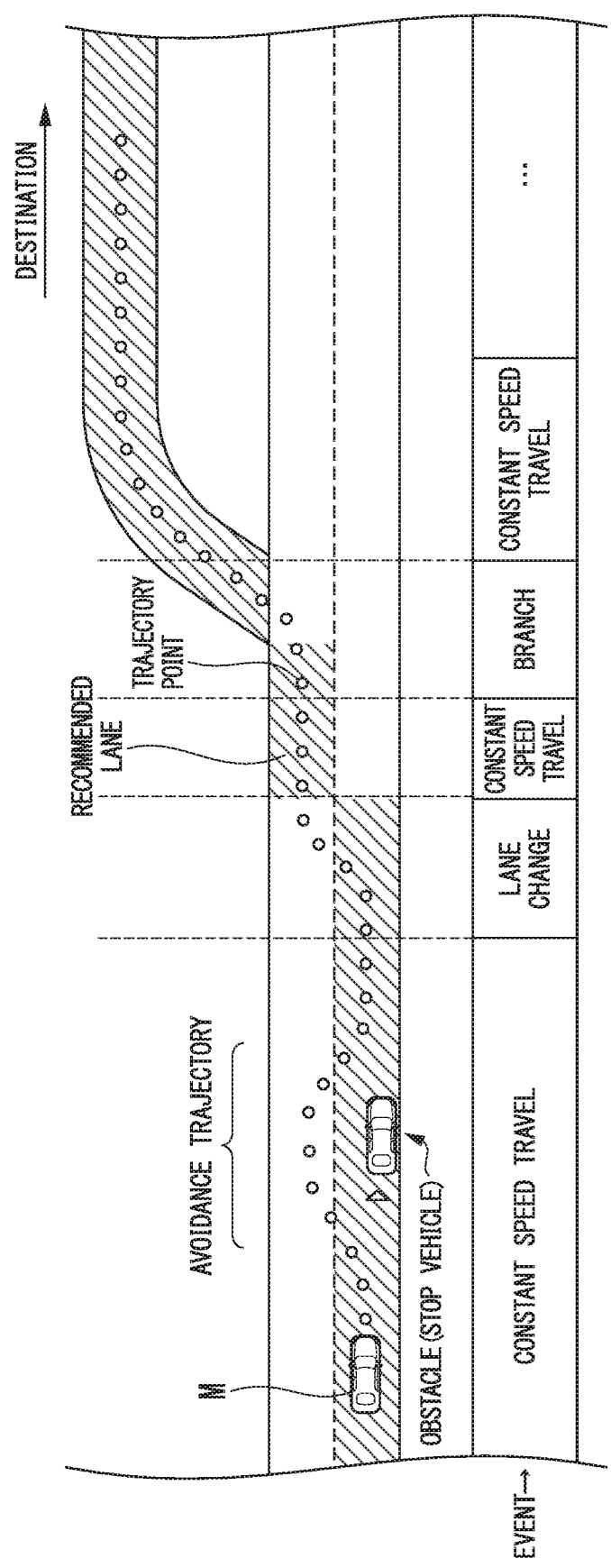
FIG. 3 is a diagram showing a state in which a target trajectory is generated on the basis of a recommended lane.

FIG. 3 is a diagram showing a state in which the target trajectory is generated on the basis of the recommended lane. As showed in FIG. 3, the recommended lane is set to be convenient for traveling along a route to a destination. When the vehicle reaches a predetermined distance before the recommended lane switching point (which may be determined according to a type of the event), the action plan generation unit 123 activates a lane changing event, a branching event, a merging event, and the like. In a case that it is necessary to avoid an obstacle during execution of one event, an avoidance trajectory is generated as showed in FIG. 3.

The action plan generation unit 123, for example, generates a plurality of target trajectory candidates, and selects an optimal target trajectory suitable for a route to a destination at that point in time on the basis of a viewpoint of safety and efficiency.

The second control unit 140 includes a travel control unit 141 and a switching control unit 142. The travel control unit 141 controls the travel driving force output device 200, the brake device 210, and the steering device 220 so that the vehicle M passes along the target trajectory generated by the action plan generation unit 123 according to scheduled times.

The switching control unit 142 switches the driving mode of the vehicle M on the basis of the action plan generated by the action plan generation unit 123. For example, the switching control unit 142 may switch the driving mode from manual driving to automatic driving at a scheduled start point of the automatic driving. The switching control unit 142 may switch the driving mode from automatic driving to manual driving at a scheduled end point of the automatic driving.

The switching control unit 142 may switch between automatic driving and manual driving on the basis of a switching signal input from an automatic driving changeover switch included in the HMI 30, for example. The switching control unit 142 may switch the driving mode of the vehicle M from automatic driving to manual driving on the basis of an operation for instructing acceleration, deceleration, or steering with respect to the driving operator 80 such as an accelerator pedal, a brake pedal, or a steering wheel.

At the time of manual driving, input information from the driving operator 80 is output to the travel driving force output device 200, the brake device 210, and the steering device 220. The input information from the driving operator 80 may be output to the travel driving force output device 200, the brake device 210, and the steering device 220 via the automatic driving control unit 100. Each electronic control unit (ECU) of the travel driving force output device 200, the brake device 210, and the steering device 220 performs an operation on the basis of the input information from the driving operator 80 or the like.

The interface control unit 150 outputs, for example, a notification regarding a traveling state at the time of automatic driving or manual driving of the vehicle M, a timing at which switching between the automatic driving and the manual driving occurs, or a request for causing the occupant to perform manual driving to the HMI 30. The interface control unit 150 may cause the HMI 30 to output information on the control content in the seat control unit 160. The interface control unit 150 may output the information received by the HMI 30 to the first control unit 120 or the seat control unit 160.

The seat control unit 160, for example, controls the seat device 300 on the basis of information received by the HMI 30, and also controls the seat device 300 at the time of switching of the driving mode in the switching control unit 142 as will be described below. The seat control unit 160 controls the seat device 300 on the basis of information detected by the seat device 300. A function of the seat control unit 160 will be described below in detail.

The travel driving force output device 200 outputs a travel driving force (torque) for travel of the vehicle to driving wheels. The travel driving force output device 200 includes, for example, a combination of an internal combustion engine, an electric motor, a transmission, and the like, and an ECU that controls these. The ECU controls the above configuration according to information input from the travel control unit 141 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the travel control unit 141 or information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder as a backup.

The brake device 210 is not limited to the above-described configuration and may be an electronically controlled hydraulic brake device that controls an actuator according to information input from the travel control unit 141 or information input from the driving operator 80 to transfer the hydraulic pressure of the master cylinder to the cylinder. Further, the brake device 210 may include a plurality of brake device systems in consideration of safety.

The steering device 220 includes, for example, a steering ECU and an electric motor. The electric motor, for example, applies a force to a rack and pinion mechanism to change a direction of a steered wheel. The steering ECU drives the electric motor according to the information input from the travel control unit 141 or information input from the driving operator 80 to change the direction of the steered wheel.

The seat device 300 is a seat on which an occupant of the vehicle M is seated, and is a seat that can be driven electrically. The seat device 300 includes, for example, a driver's seat, a passenger' seat, a rear seat, and the like in which the driving operator 80 is provided.

[Seat Control System]

Hereinafter, the seat control system 40 of the first embodiment will be described. The seat control system 40 includes a seat device 300 and a seat control unit 160.

Figure 4:
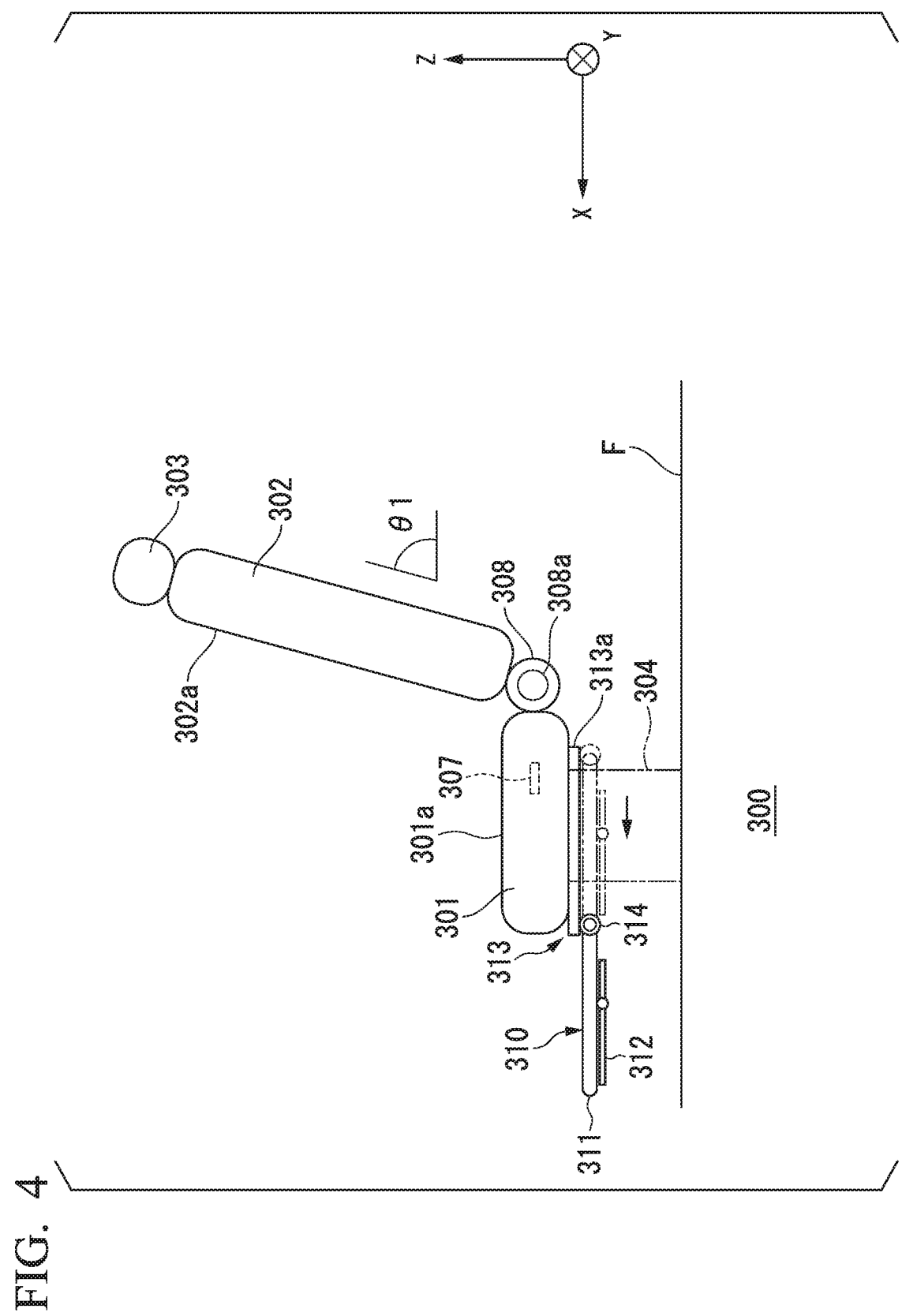
FIG. 4 is a configuration diagram of a seat device 300 according to the first embodiment.

FIG. 4 is a diagram showing the seat device 300. The seat device 300 includes, for example, a seating portion 301, a backrest portion 302, a footrest portion 310. One end of the seating portion 301 and a lower end of the backrest portion 302 are rotatably connected by a first connection unit 308. A headrest 303 is provided at the upper end of the backrest portion 302.

The seating portion 301 is a member that supports a lower half of a body of the occupant. A seat surface 301a on which the driver sits is formed in the seating portion 301. The seat surface 301a is formed of a cushioning material. The seating portion 301 is attached to a floor surface F via a fixing member 304. In a space between the floor surface F and the seating portion 301, the footrest portion 310 is provided to be storable. A configuration of the footrest portion will be described in detail below. One end of the seating portion 301 and a lower end of the backrest portion 302 are rotatably connected to each other via the first connection unit 308.

The backrest portion 302 is a member that supports a torso portion of the occupant. A backrest surface 302a is formed in the backrest portion 302. The backrest surface 302a is formed of a cushioning material. The headrest 303 is provided at a distal end of the backrest portion 302. The headrest 303 supports a head portion or a neck portion of the occupant D seated on the seating portion 301. The backrest portion 302 can enter a reclining state with the rotation angle with respect to the floor surface F through the first connection unit 308. The first connection unit 308 has, for example, a rotation hinge structure.

The first connection unit 308 includes, for example, a biasing means (not showed) such as a rotating spring, and biases the backrest portion 302 in a direction (+X direction) in which an angle between the backrest portion 302 and the seating portion 301 is reduced. The first connection unit 308 includes a locking mechanism (not showed) interlocking with a lever 307 provided in the seating portion 301.

In a case that the lever 307 is released, the backrest portion 302 falls forward (in the +X direction) around the first connection unit 308 due to a biasing force of the first connection unit 308. In a case that the occupant applies a force to the backrest surface 302a in a rearward direction (−X direction) in a state in which the lever 307 is released, the backrest portion 302 falls backward around the first connection unit 308. Thereafter, in a case that the lever 307 is locked, the angle of the backrest portion 302 is maintained and fixed. Thus, the occupant can adjust the reclining angle of the backrest portion 302. Although the above configuration of the first connection unit 308 is showed as a mechanical type, the first connection unit 308 may be electrically controlled or any configuration such as a stepping motor or an actuator can may be used as long as an angle can be adjusted. In a case that the first connecting unit 308 is electrically driven, the first connecting unit 308 is controlled by the seat control unit 160

The first connection unit 308 includes a first angle detection unit 308a (see FIG. 5) that detects a first angle θ1 that is formed between the seating portion 301 and the first backrest portion 302. The first angle detection unit 308a is connected to the seat control unit 160. For example, since the seating portion 301 is installed in parallel to the floor surface F, an angle that is formed between the floor surface F and the backrest portion 302 may be treated as the first angle θ1.

Figure 5:
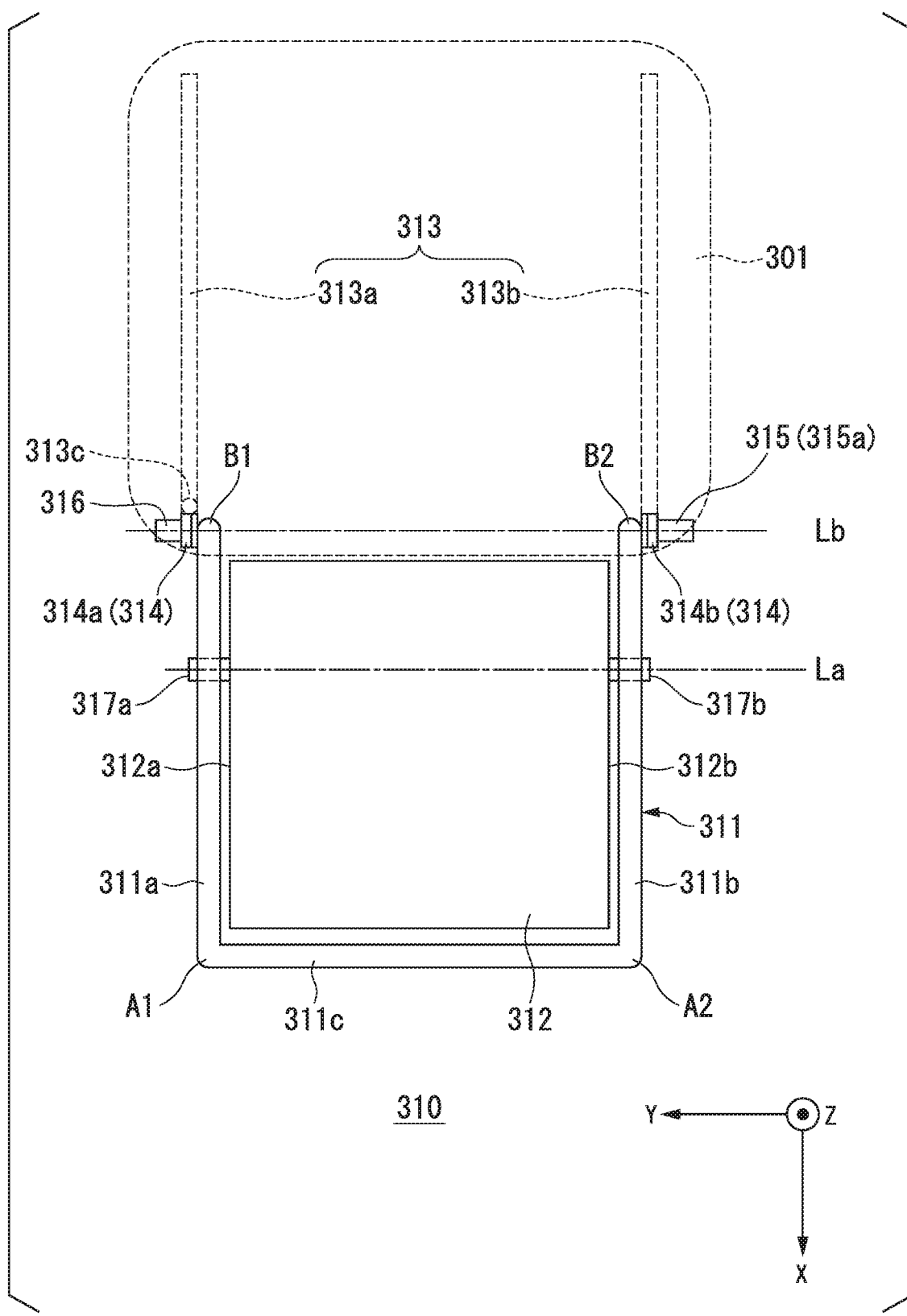
FIG. 5 is a plan view showing a configuration of a footrest portion 310.

FIG. 5 is a plan view showing a configuration of the footrest portion 310. The footrest portion 310 is a so-called ottoman. The footrest portion 310 includes a frame body 311, a leg support portion 312, a rail portion 313, and a second connection unit 314. The rail portion 313 includes a pair of rail members 313a and 313b and a position detection unit 313c. The pair of rail members 313a and 313b are attached in parallel to a bottom surface of the seating portion 301.

The position detection unit 313c is provided at a distal end (a distal end in the +X direction) of any one of the pair of rail members 313a and 313b. Although a configuration in which the position detection unit 313c is provided at the distal end of the rail member 313a is showed in the embodiment, the position detection unit 313c may be provided on at least one of the rail members 313a and 313b. For the position detection unit 313c, for example, a mechanical switch may be used. For the position detection unit 313c, any unit may be used as long as the unit can detect a position of an object.

The position detection unit 313c detects that the frame body 311 is positioned at the distal end. The position detection unit 313c outputs a detection result to the seat control unit 160. The frame body 311 is rotatably connected to the rail portion 313 below the rail portion 313 via the second connection unit 314.

The second connection unit 314 includes a pair of connection members 314a and 314b. The second connection unit 314 is slidably attached to the rail portion 313. The pair of connection members 314a and 314b are attached to a pair of rail members 313a and 313b, respectively. Accordingly, the frame body 311 becomes slidable in a front-rear direction (an X-axis direction) with respect to the rail portion 313. The frame body 311 can be stored in the seating portion 301.

The frame body 311 is, for example, a pipe frame formed into a reverse gate shape (rectangular open channel) cross section shape by bending a pipe. The frame body 311 may be formed by welding a pipe or may be formed by connecting pipes with a joint. The frame body 311 includes, for example, a pair of vertical frames 311a and 311b and a horizontal frame 311c. The pair of vertical frames 311a and 311b are, for example, arranged in parallel to be opposed to each other in a traveling direction (an X-axis direction).

The horizontal frame 311c that connects the distal ends A to each other is provided at the respective distal ends A1 and A2 of the pair of vertical frames 311a and 311b. The horizontal frame 311c supports the heels of the occupant. A position of the horizontal frame 311c may be a position other than the respective distal ends A1 and A2 of the pair of vertical frames 311a and 311b.

The horizontal frame 311c is arranged in a left-right direction (a Y-axis direction). The connection members 314a and 314b of the second connection unit 314 are respectively provided at proximal ends B1 and B2 of the pair of vertical frames 311a and 311b. The frame body 311 is rotated around a rotation shaft (a second rotation shaft) Lb in the Y-axis direction relative to the seating portion 301 by the second connection unit 314. A driving unit 315 for rotationally driving the frame body 311 is provided in the connection member 314b of the second connection unit 314. The driving unit 315 may be provided in at least one of the pair of connection members 314a and 314b. The driving unit 315 is connected to the seat control unit 160.

A second angle detection unit 315a that detects the rotation angle of the second connection unit 314 is provided in the driving unit 315. The second angle detection unit 315a detects a second angle θ2 between the rail portion 313 and the frame body 311. The second angle detection unit 315a may be provided separately from the driving unit 315 or may be provided integrally with the driving unit 315.

The second angle detection unit 315a is connected to the seat control unit 160. The second angle detection unit 315a outputs a detection result of the second angle θ2 of the second connection unit 314 to the seat control unit 160. The seat control unit 160 controls the driving unit 315 on the basis of the detection result of the first angle detection unit 308a to adjust the second angle detection unit 315a.

A lock mechanism 316 that locks the sliding of the frame body 311 with respect to the rail portion 313 is provided in the connection member 314a of the second connection unit 314. The driving unit 315 and the lock mechanism 316 are connected to the seat control unit 160 and are controlled by the seat control unit 160 (see FIG. 6). The lock mechanism 316 is unlocked by the seat control unit 160 at the time of automatic driving. That is, the frame body 311 is loaded or unloaded below the seating portion 301 at the time of automatic driving. In a case that the frame body 311 is pulled out from the seating portion 301 by the occupant and is positioned at a distal end of the rail portion 313, the position detection unit 313c detects the frame body 311 and outputs a detection result to the seat control unit 160.

The seat control unit 160 starts control of the driving unit 315 on the basis of a detection result of the position detection unit 313c. The frame body 311 is controlled to be rotated downward around the rotation shaft Lb under the control of the seat control unit 160. The control of the driving unit 315 will be described below.

A leg support portion 312 is provided on the inner side of the frame body 311. The leg support portion 312 is a rectangular plate-like body, and is formed to be smaller than an inner shape of the frame body 311. A pair of rotation connection units 317a and 317b are provided on side surfaces 312a and 312b in a left-right direction (Y— axis direction) of the leg support portion 312. The pair of rotation connection units 317a and 317b rotate the leg support portion 312 relative to the frame body 311 around the rotation shaft (the first rotation shaft) La in the extending direction of the horizontal frame 311c.

The leg support portion 312 is arranged in parallel in the extending direction of the pair of vertical frames 311a and 311b in a state in which the frame body 311 is stored under the seating portion 301. This position of the leg support portion 312 is called an initial state.

In the pair of rotation connection units 317a and 317b, in a case that the leg support portion 312 is rotated around the rotation shaft La by, for example, a spring (not showed), a biasing force is applied to the leg support portion 312 in a direction for return to the initial state around the rotation shaft L2. Therefore, in a case that the leg support portion 312 rotates within a predetermined angle range around the rotation shaft La after the frame body 311 is pulled out from the seating portion 301, the leg support portion 312 is rotated in a direction opposite to the rotation direction around the rotation shaft La by a biasing force of the spring and returns to the initial state.

Figure 6:
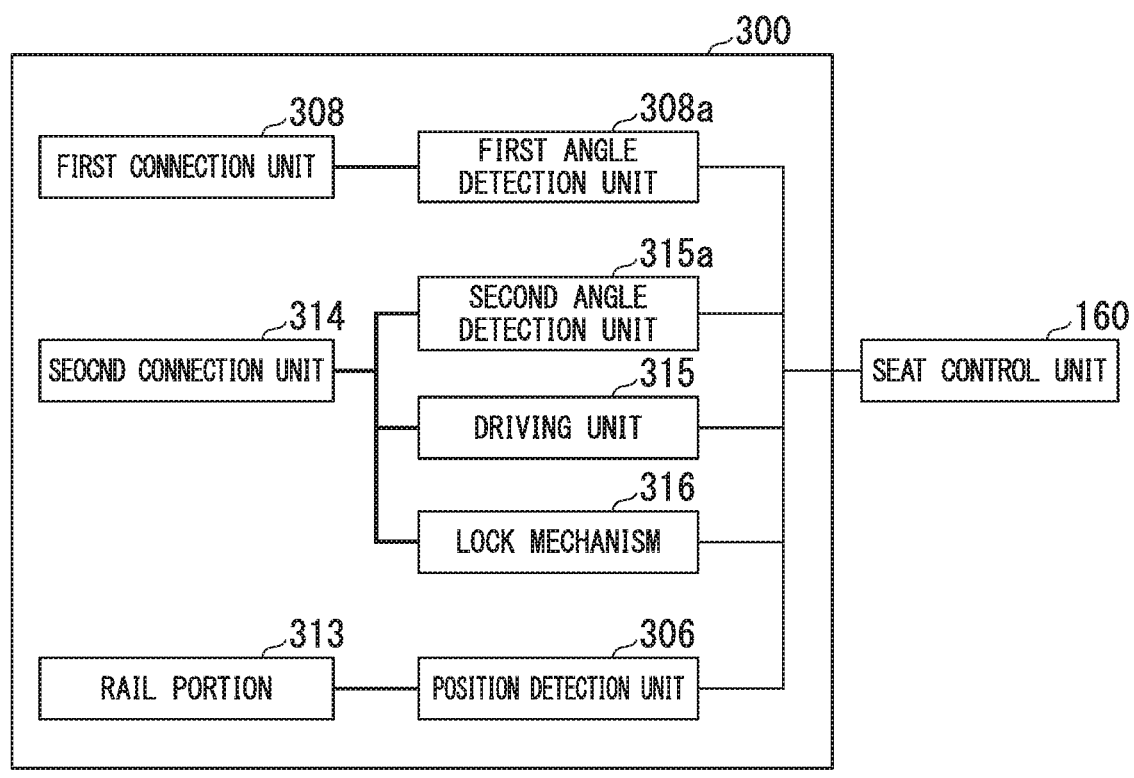
FIG. 6 is a block diagram showing a configuration of a seat control system 40.

FIG. 6 is a block diagram showing a configuration of the seat control system 40. The seat control unit 160 controls the driving unit 315 to adjust the second angle θ2 on the basis of the detection result of the first angle detection unit 308a. The seat control unit 160 controls the seat device 300, for example, when the driving mode of the vehicle M is switched from manual driving to automatic driving. When the switching control unit 142 (see FIG. 1) switches the driving mode from the manual driving to the automatic driving at a scheduled start point of the automatic driving (see FIG. 3), the seat control unit 160 starts the control of the seat device 300.

In this case, the seat control unit 160 may display the fact that the control of the seat device 300 is started on the HMI 30. When the switching control unit 142 has switched the driving mode from the automatic driving to the manual driving at a scheduled end point of the automatic driving, the seat control unit 160 may control the seat device 300 to cause the state of the seat device 300 to return to the state of the seat device 300 at the time of the end of previous manual driving.

Figure 7:
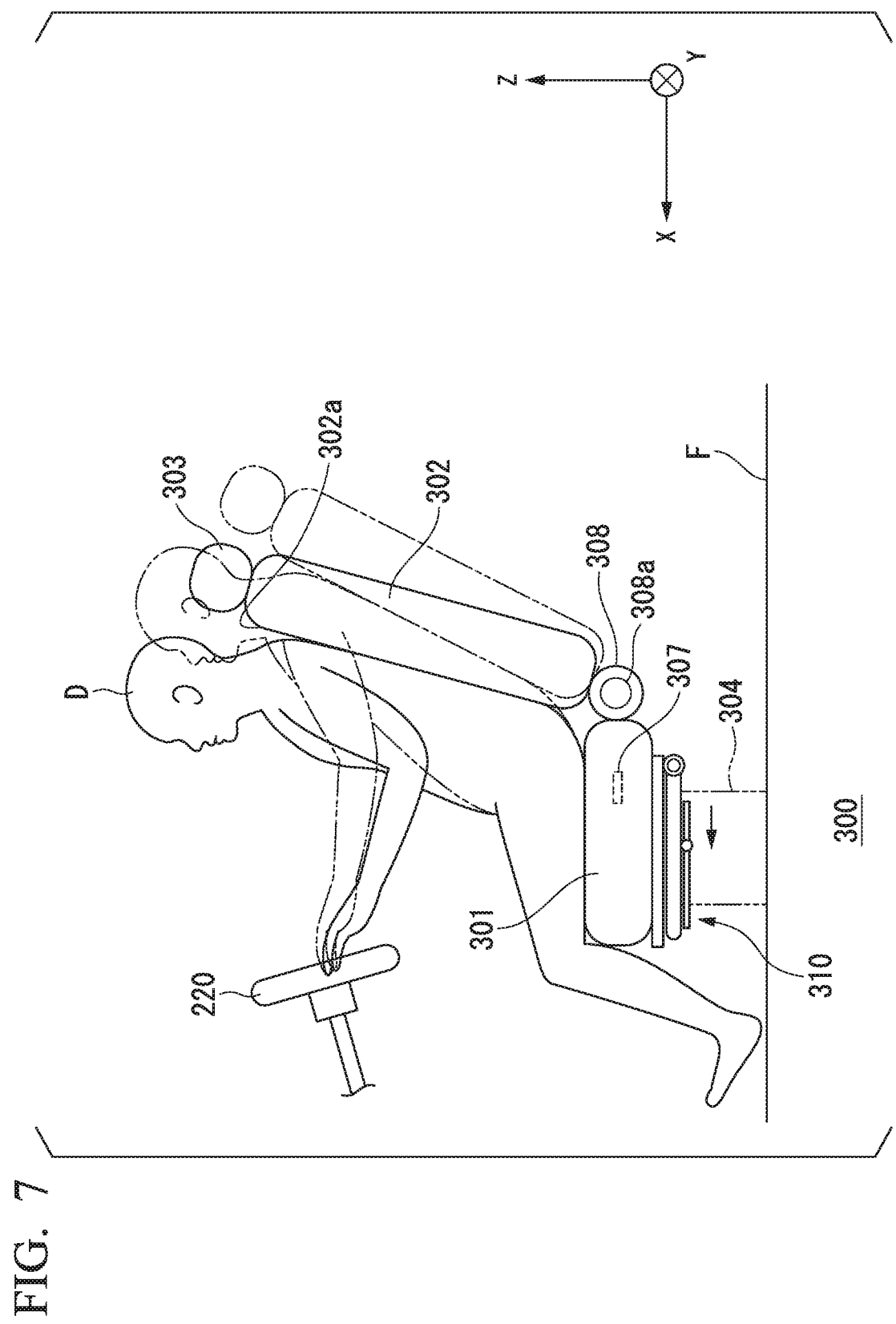
FIG. 7 is a diagram showing a seat device 300 in a reclining state.

Hereinafter, a specific method of controlling the seat device 300 using the seat control unit 160 will be described. FIG. 7 is a diagram showing the seat device 300 in the reclining state. When the vehicle M is switched to the automatic driving, the seat control unit 160 releases the lock mechanism 316 of the second connection unit 314 so that the footrest portion 310 can be loaded or unloaded.

In a case that the backrest portion 302 enters the reclining state, the occupant D unlocks the first connection unit 308 while pulling the lever 307 provided on the side surface of the seating portion 301, for example. Thereafter, the occupant presses the backrest portion 302 back (in the X direction) to form the reclining angle, and returns the lever 307 again, locks the first connection unit 308, and maintains the backrest portion 302 in the reclining state.

Figure 8:
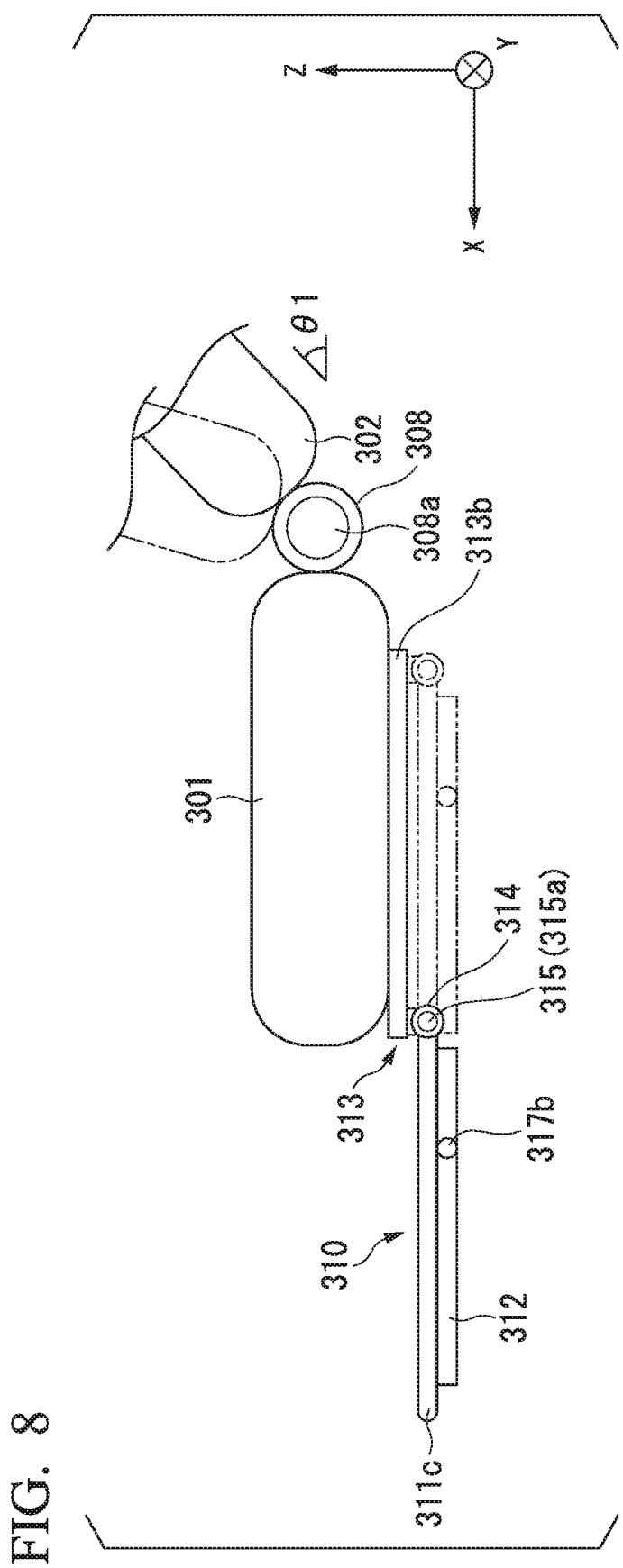
FIG. 8 is a diagram showing a state in which the footrest portion 310 is pulled out from a seating portion 301.

FIG. 8 is a diagram showing a state in which the footrest portion 310 is pulled out from the seating portion 301. For example, the occupant D causes the backrest portion 302 to enter the reclining state, and then pulls out the footrest portion 310. The seat control unit 160 recognizes that the footrest portion 310 has been pulled forward (in the +X direction) on the basis of the detection result of the position detection unit 306 of the rail portion 313. The seat control unit 160 starts control of the driving unit 315. That is, the seat control unit 160 starts adjustment of the second angle θ2 of the second connection unit 314.

Figure 9:
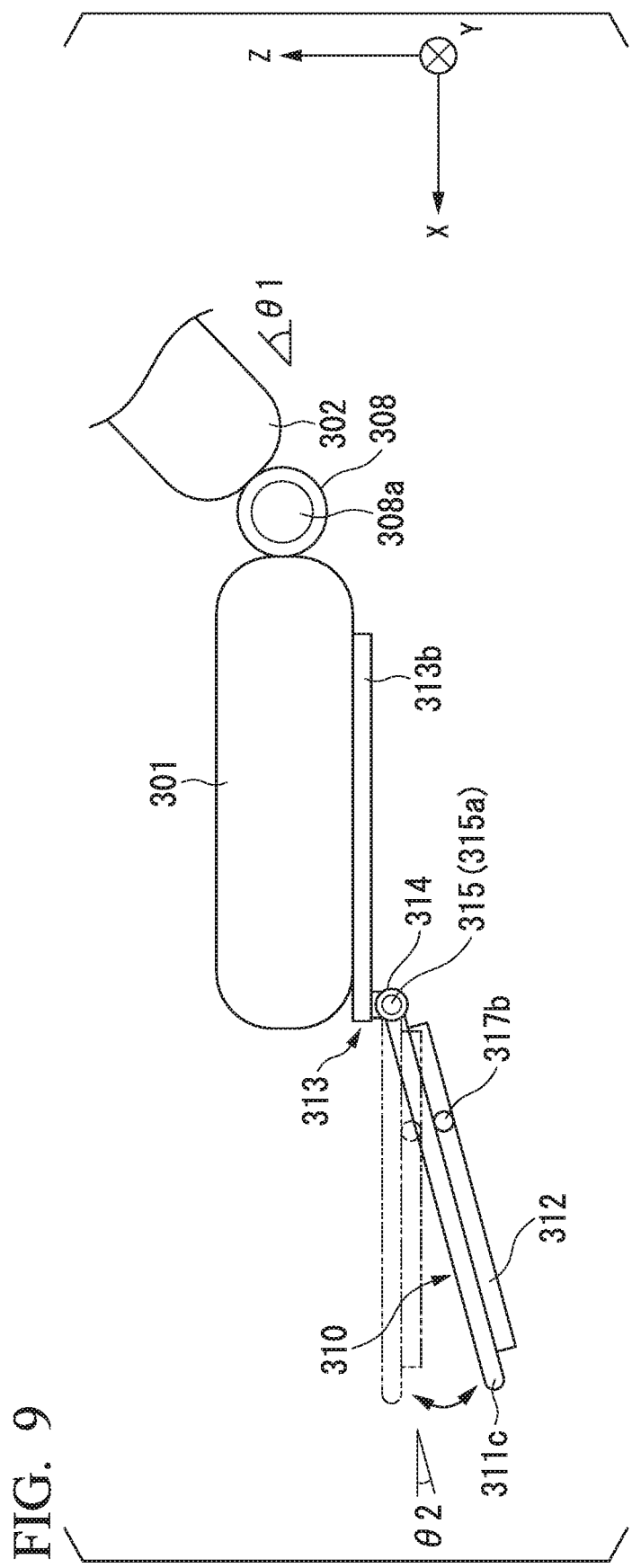
FIG. 9 is a diagram showing a state of the angle-adjusted footrest portion 310.

FIG. 9 is a diagram showing a state of the angle-adjusted footrest portion 310. The seat control unit 160 controls the driving unit 315 to adjust an optimum second angle θ2 of the second connection unit 314 with respect to the first angle θ1 of the first connection unit 308 on the basis of a detection result of the first angle θ1 of the first angle detection unit 308a. That is, the seat control unit 160 adjusts the angle of the footrest portion 310 so that the occupant D can easily put his or her feet on the footrest portion 310 according to the reclining angle. For example, in a case that the reclining angle is large, that is, in a case that θ1 is small, the second angle θ2 is adjusted to be small.

Figure 10:
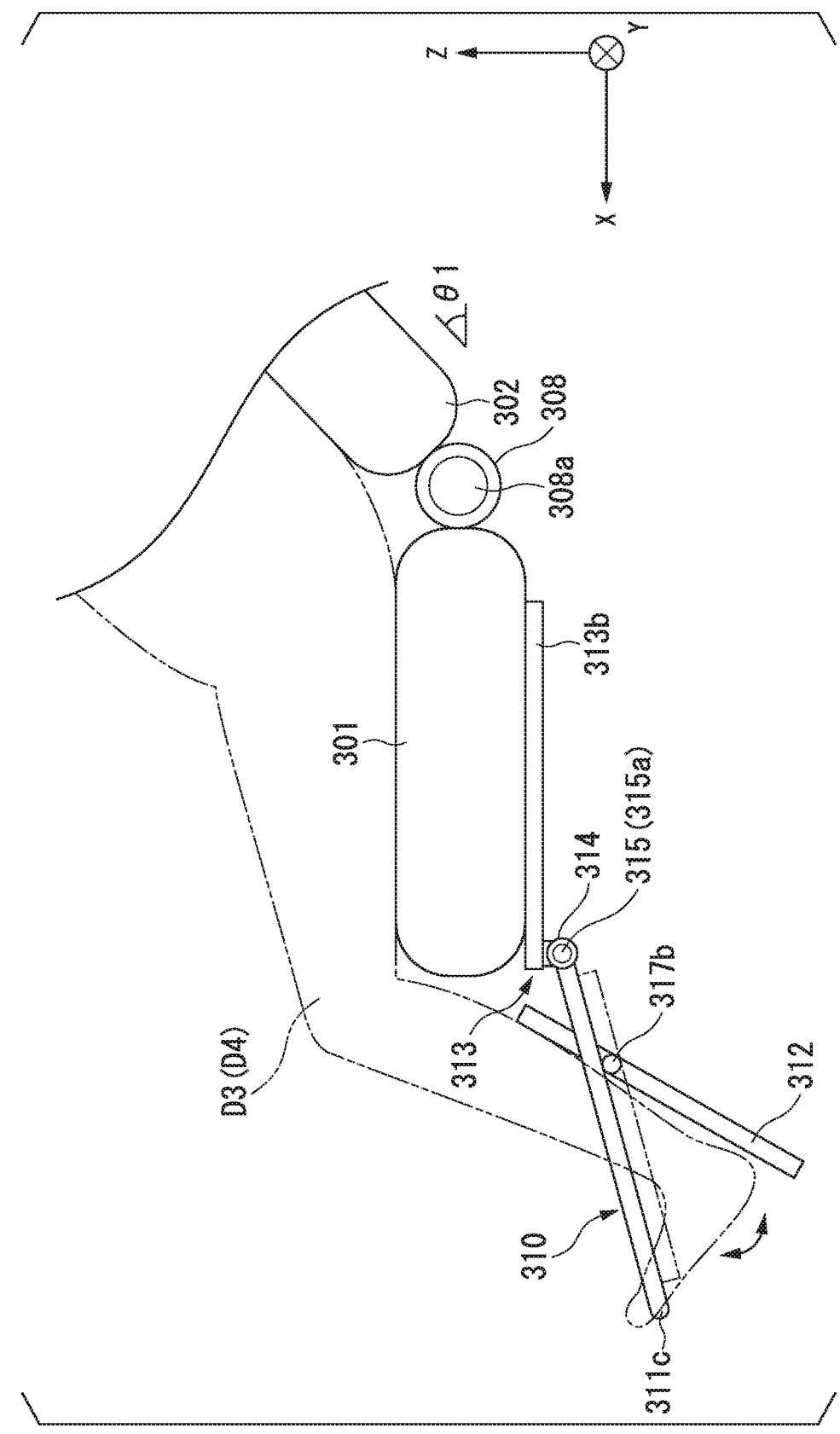
FIG. 10 is a diagram showing a state in which a leg support portion 312 is rotated.

FIG. 10 is a diagram showing a state in which the leg support portion 312 is rotated. In a case that the occupant D places the leg portion on the leg support portion 312 after the second angle θ2 is adjusted, the leg support portion 312 is rotated due to a weight of the leg portion in a case that the occupant places the leg portion thereon. Calves of the legs of the occupant are supported by the leg support portion 312. In this case, the heels of the occupant are supported by the horizontal frame 311c.

The adjusted second angle θ2 of the footrest portion 310 may be finely adjusted by the occupant D. In this case, the seat control system 420 may store a fine adjustment value for each occupant D, and adjust the seat device 300 for each occupant D at the time of the automatic driving. In setting for each occupant D, the seat control unit 160 may receive setting information using the HMI 30. The control of the footrest portion 310 may be arbitrarily selected by the occupant D or may be operated or released in a case that the occupant D performs an operation.

The seat control unit 160 may control the driving unit 315 to cause the second angle θ2 of the second connection unit 314 to return to a state before control start before the switching control unit 142 switches the driving mode from the automatic driving to the manual driving at the scheduled end point of the automatic driving. In this case, the seat control unit 160 may display the fact that the control of the seat device 300 is ended and storage of the footrest portion 310 is requested on the HMI 30.

Hereinafter, a flow of a process controlled by the seat control unit 160 will be described.

Figure 11:
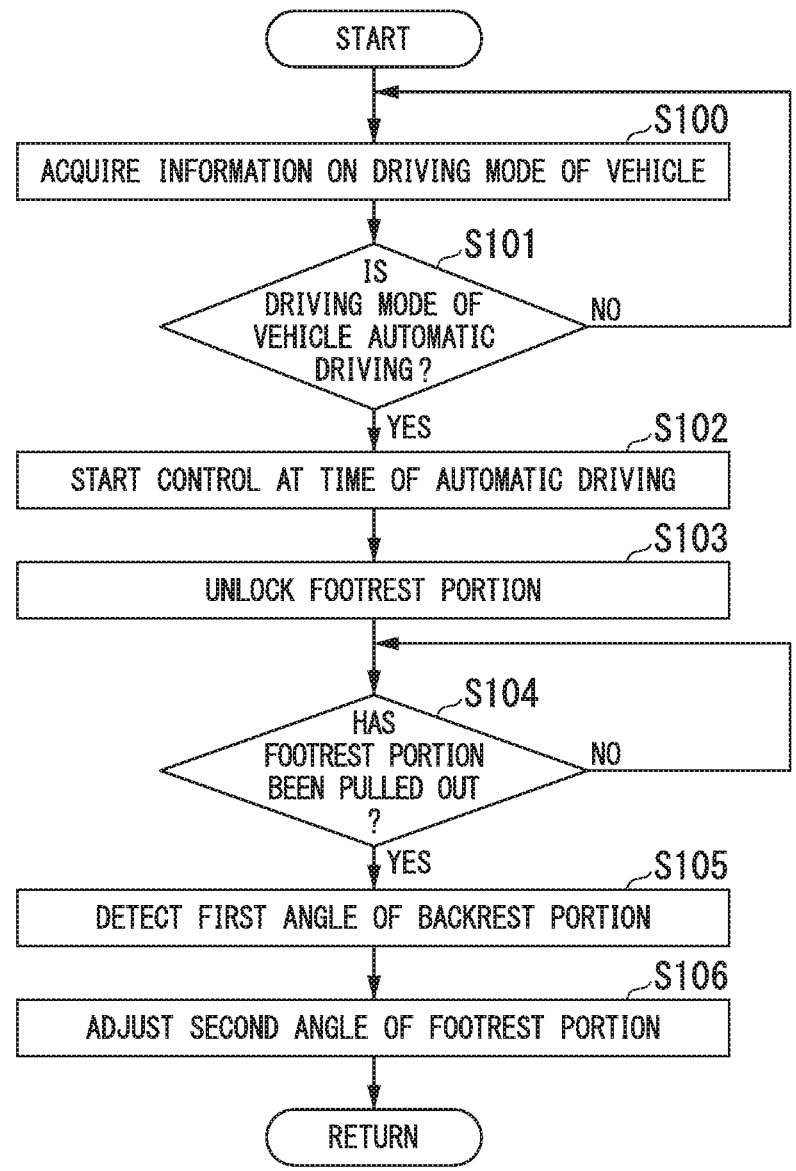
FIG. 11 is a flowchart showing a flow of a process that is performed by a seat control unit 160.

FIG. 11 is a flowchart showing a flow of a process that is performed by the seat control unit 160. The seat control unit 160 acquires information on the driving mode of the vehicle M from the switching control unit 142 (step S100). The seat control unit 160 determines whether or not the driving mode of the vehicle M is an automatic driving on the basis of the information from the switching control unit 142 (step S101). In a case that a positive determination is obtained in step S101, the seat control unit 160 starts the control of the seat device 300 at the time of automatic driving (step S102). In a case that a negative determination is obtained in step S101, the seat control unit 160 returns the process to step S100.

The seat control unit 160 releases the lock mechanism of the second connection unit 314 so that the footrest portion 310 can be pulled out from the lower side of the seating portion 301 (step S103). The seat control unit 160 determines whether or not the footrest portion 310 has been pulled out on the basis of the output result of the position detection unit 306 of the rail portion 313 (step S104). In a case that a positive determination is obtained in step S104, the seat control unit 160 detects the first angle θ1 of the backrest portion 302 on the basis of the output of the first angle detection unit 308a of the first connection unit 308 (step S105). In a case that a negative determination is obtained in step S104, the seat control unit 160 returns the process of step S104.

The seat control unit 160 controls the driving unit 315 of the second connection unit 314 on the basis of the first angle θ1 to adjust the second angle θ2 that is monitored by the second angle detection unit 315a (step S106). Thereafter, the seat control unit 160 ends the process of the flowchart.

As described above, according to the seat control system 40 of the first embodiment, in a case that the occupant D causes the seat device 300 to enter the reclining state at the time of the automatic driving of the vehicle M, the angle of the footrest portion 310 is automatically adjusted such that a comfortable seating posture of the occupant D can be secured. As a result, it is possible to improve the comfort of the occupant D at the time of the automatic driving using the seat control system 40.

Second Embodiment

In the seat control system 40 according to the first embodiment, In a case that the occupant D causes the seat device 300 to enter the reclining state at the time of the automatic driving of the vehicle M, the angle of the footrest portion 310 is automatically adjusted to improve the comfort of the occupant D. In the seat control system 42 of the second embodiment, an additional function is added to the footrest portion 310 to further improve the comfort of the occupant D at the time of automatic driving.

Figure 12:
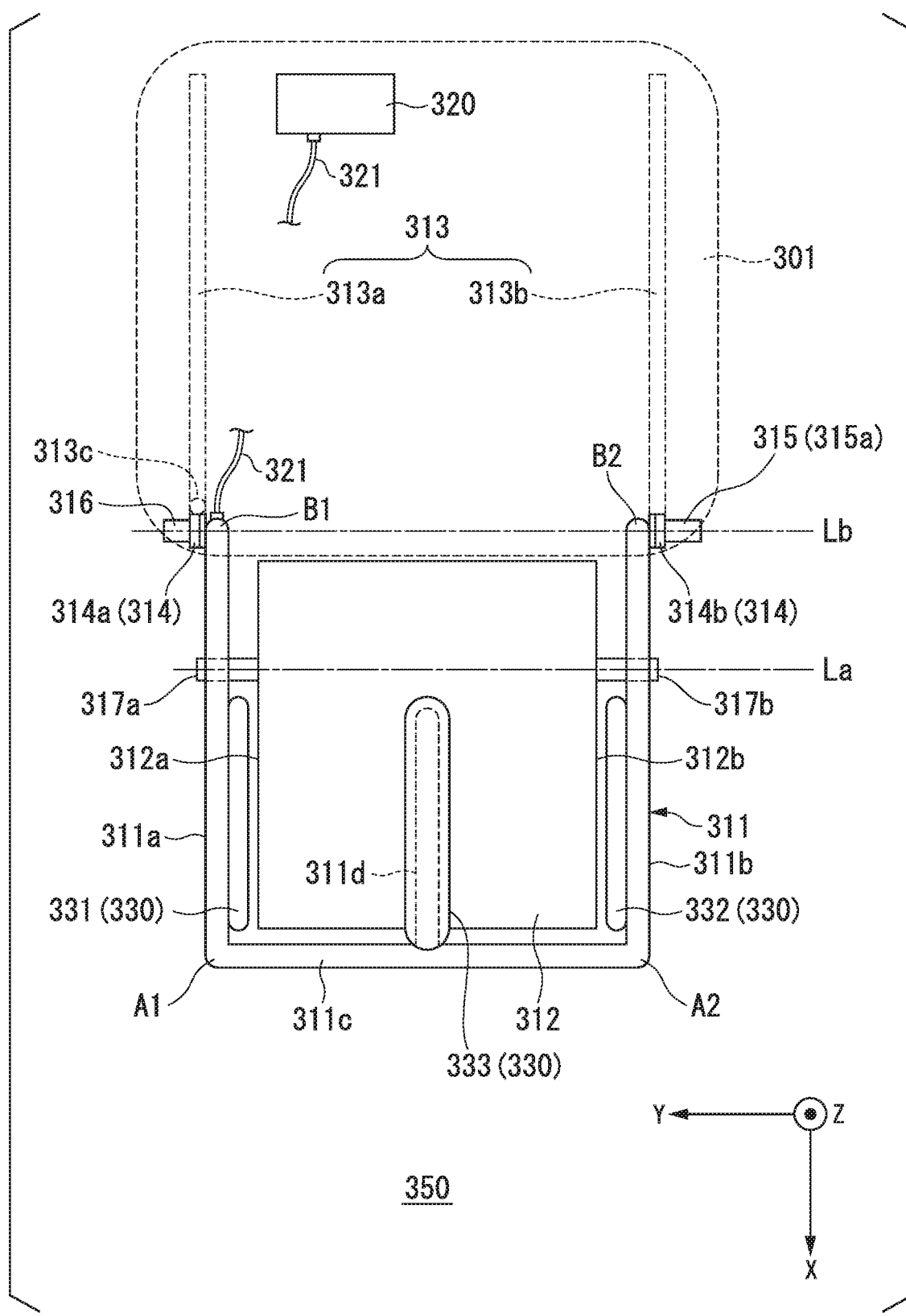
FIG. 12 is a diagram showing a configuration of a seat device 350 according to a second embodiment.

FIG. 12 is a diagram showing a configuration of a seat device 350 according to the second embodiment. The seat device 350 further includes, for example, a bag body portion 330 and a pressurizing unit 320, as compared with the configuration of the seat device 300.

The pressurizing unit 320 is a device that pressurizes the inside of the bag body portion 330 using a fluid f. The pressurizing unit 320 is, for example, a compressor that sends air. The pressurizing unit 320, for example, is arranged on the floor surface F below the seating portion 301. The pressurizing unit 320 is arranged not to be an obstacle in a state in which the footrest portion 310 is accommodated under the seating portion 301.

A flexible pipe 321 (for example, an air hose) is connected between the pressurizing unit 320 and the proximal end B1 of the vertical frame 311a. Accordingly, the pressurizing unit 320 can pressurize the frame body 311 by causing the fluid f to flow into the frame body 311. When the pressurizing unit 320 is in operation, the inside of the frame body 311 is pressurized, and when the pressurizing unit 320 stops, the applied fluid f flows out of the frame body 311. The pressurizing unit 320 may perform decompression, in addition to the pressurization. The pressurizing unit 320 is controlled by the seat control unit 160. The control of the pressurizing unit 320 will be described below.

Figure 13:
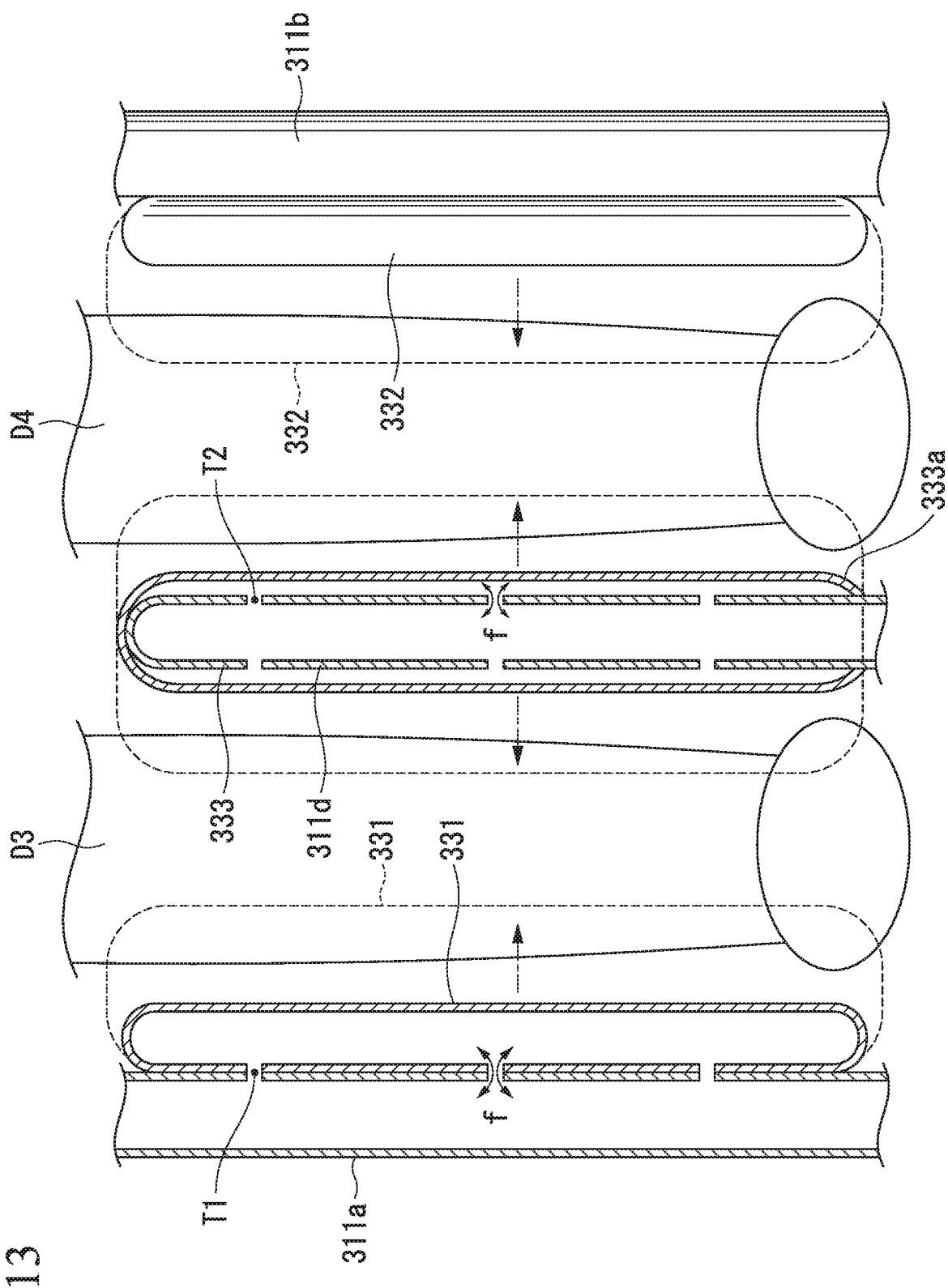
FIG. 13 is a cross-sectional diagram showing a configuration of a bag body portion 330.

FIG. 13 is a cross-sectional diagram showing a configuration of the bag body portion 330. The bag body portion 330 is an inflatable air bag for causing the leg portion of the occupant to be sandwiched. The bag body portion 330 includes, for example, a pair of side bag bodies 331 and 332, and a central bag 333. A shape of the bag body portion 330 at the time of contraction is formed not to hinder loading and unloading of the footrest portion 310.

The side bag body 331 extends along the inner side of the vertical frame 311a. Similarly, the side bag body 332 extends along the inner side of the vertical frame 311b. Since the side bag body 331 and the side bag body 332 have the same configuration, the side bag body 331 will be described as a representative.

In the side bag body 331, the side bag body 331 and the vertical frame 311a are in close contact with each other, for example, through adhesion with an adhesive. A plurality of through holes T1 penetrating the inside of the side bag body 331 and the vertical frame 311a are formed in a adhesion portion between the side bag body 331 and the vertical frame 311a. A fluid f (for example, air) flowing inside the vertical frame 311a flows into and from the through hole T1, and the inside of the side bag body 331 is pressurized or decompressed by the fluid.

For the fluid f, a liquid can also be used. When the fluid f flows into the side bag body 331 and the side bag body 331 is pressurized, the side bag body 331 expands into a shape that presses one side surface of one leg D3 of the occupant D from the side. The side bag body 331 is made of rubber, for example. In this case, the side bag body 331 is elastically deformed according to a shape of the leg D3.

Next, the central bag 333 will be described. The central bag 333 is provided between the side bag bodies 331 and 332 in the pair. The central bag 333 is formed in an extending direction of the vertical frames 311a and 311b. A support pipe 311d provided toward the inside of the frame body 311 in the extending direction of the vertical frames 311a and 311b from a center of the horizontal frame 311c is provided inside the central bag 333.

That is, the central bag 333 covers the support pipe 311d, and a proximal end 333a of the central bag 333 is adhered to the support pipe 311d, for example, with an adhesive to maintain airtightness. The support pipe 311d is a tubular member formed of the same material as the frame body 311. A proximal end of the support pipe 311d is connected to the horizontal frame 311c, and the inside of the support pipe 311d and the inside of the horizontal frame 311c are communicated. A plurality of through holes T2 are formed in the support pipe 311d.

In the through holes T2, a fluid f (for example, air) flowing inside from the support pipe 311d flows in and out, and the inside of the central bag 333 is pressurized or decompressed by the fluid. When the fluid f flows into the central bag 333 and the central bag 333 is pressurized, the central bag 333 expands into a shape that presses opposing surfaces of the legs D3 and D4 from between the pair of legs D3 and D4 of the occupant D. The side bag body 331 is formed of rubber, for example. In this case, the central bag 333 is elastically deformed according to shapes of the legs D3 and D4.

Thus, the leg portions D3 and D4 of the occupant D are sandwiched by the pair of side bag bodies 331 and 332 and the central bag 333 when the bag body portion 330 inflates.

Figure 14:
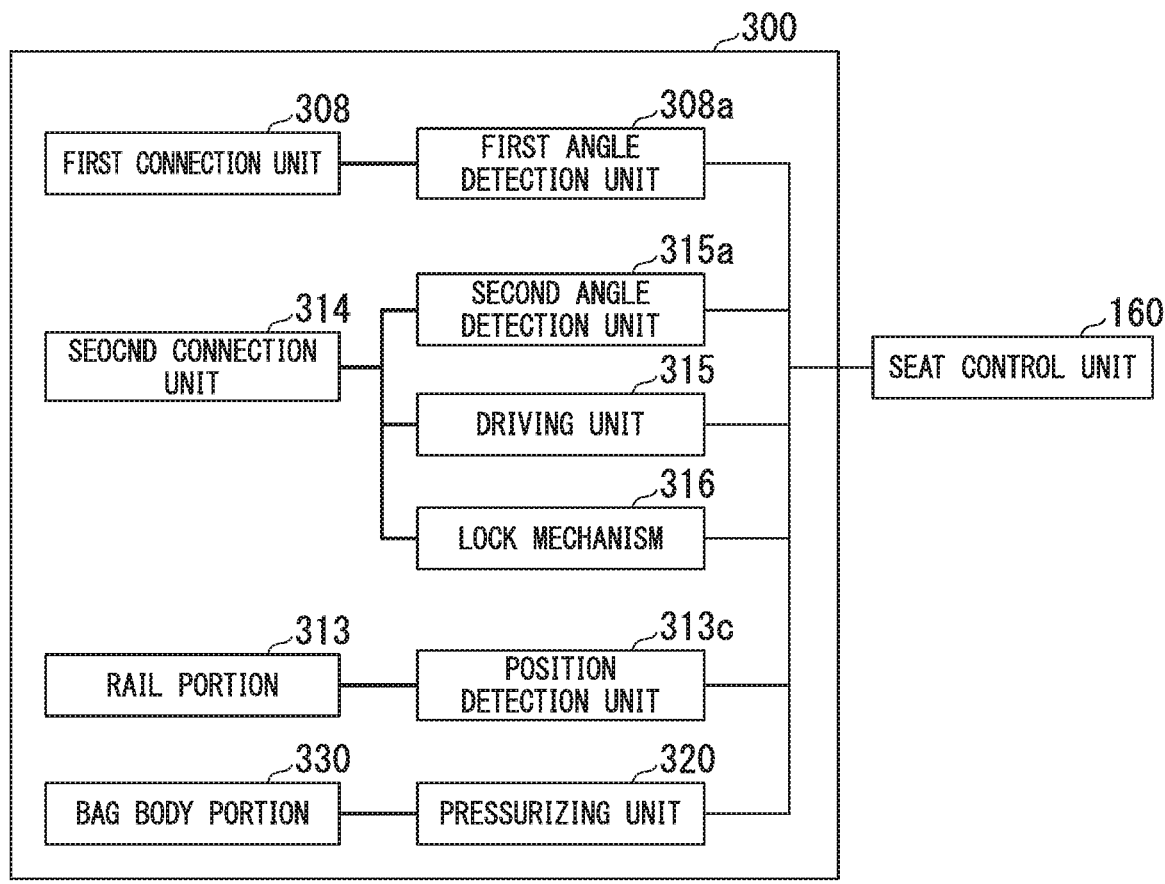
FIG. 14 is a block diagram showing a configuration of a seat control system according to a second embodiment.

FIG. 14 is a block diagram showing a configuration of the seat control system 42 according to the second embodiment. The seat control system 42 further includes a pressurizing unit 320 for controlling expansion of the bag body portion 330, as compared with the configuration of the seat control system 40 of the first embodiment. The pressurizing unit 320 sends the fluid f to the inside of the bag body portion 330 to inflate the bag body portion 330 in a pressurized state under control of the seat control unit 160.

Figure 15:
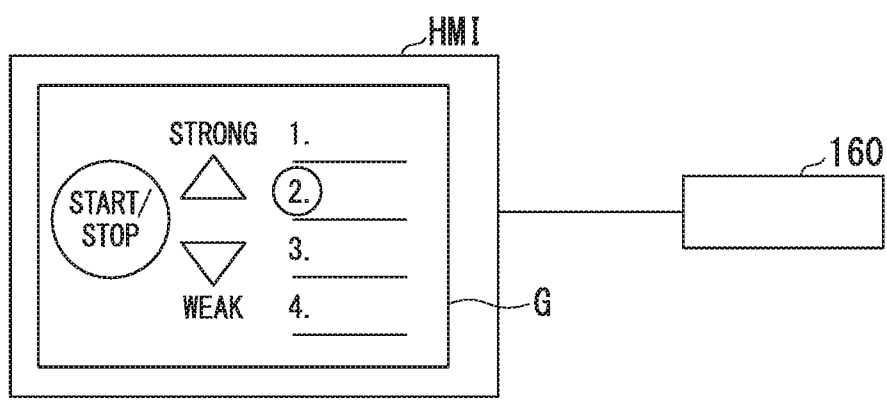
FIG. 15 is a diagram showing a selection screen G that is displayed on an HMI 30.

The seat control unit 160 changes a degree of expansion of the bag body portion 330 over time by controlling the pressurizing unit 320. That is, the seat control unit 160 can apply a massage to the leg portions D3 and D4 of the occupant D using the bag body portion 330. A control aspect of the pressurizing unit 320 may be changed by the occupant D through the selection screen G that is displayed on the HMI 30, for example. FIG. 15 is a diagram showing the selection screen G that is displayed on the HMI 30.

Figure 16:
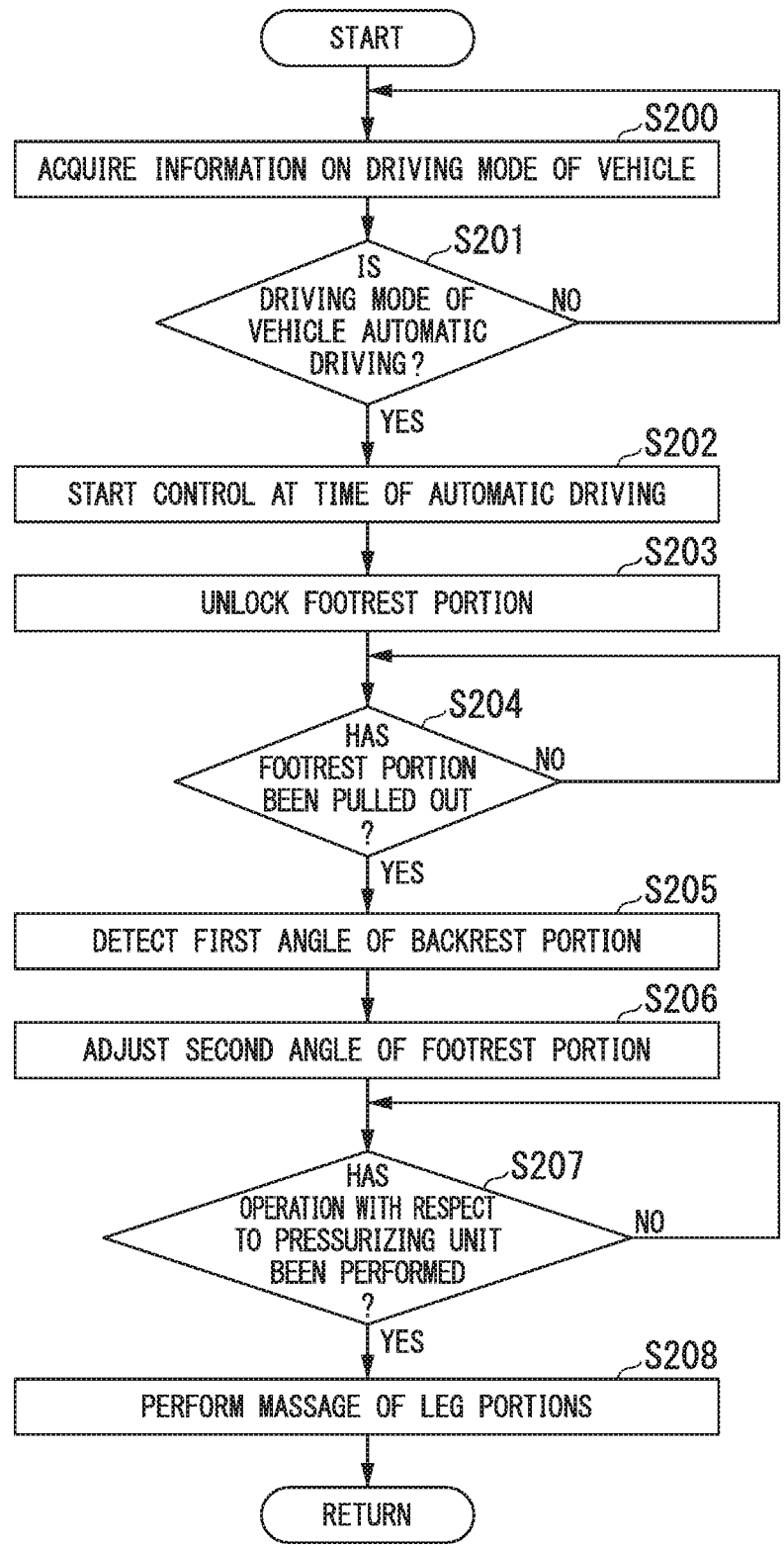
FIG. 16 is a flowchart showing a flow of a process that is performed by a seat control unit 160.

Next, a flow of a process that is controlled by the seat control unit 160 of the seat control system 42 will be described. FIG. 16 is a flowchart showing a flow of a process that is performed by the seat control unit 160. Steps S200 to S206 are the same as those in the first embodiment. In this case, steps S207 and S208 are added. Hereinafter, description of the same process as in the first embodiment will be appropriately omitted.

The seat control unit 160 adjusts the second angle θ2 of the footrest portion 310 (step S206), and then, determines whether or not an operation with respect to the pressurizing unit 320 has been performed through the selection screen G displayed on the HMI 30 (step S207). In a case that a positive determination is obtained in step S207, the seat control unit 160 changes the control aspect of the pressurizing unit 320 on the basis of the operation selected on the selection screen G, and performs massage of the leg portions D3 and D4 of the occupant D (step S208). Thereafter, the seat control unit 160 ends the process of the flowchart. In a case that a negative determination is obtained in step S207, the seat control unit 160 returns the process to step S207.

As described above, according to the seat control system 42 of the second embodiment, it is possible to improve comfort at the time of automatic driving by controlling the pressurizing unit 320 of the footrest portion 310 pulled out by the occupant D at the time of automatic driving.

Third Embodiment

In the seat control system 42 of the second embodiment, the massage is performed to improve comfort at the time of automatic driving by controlling the pressurizing unit 320. In a third embodiment, a seat control system 44 that gives more comfort to the occupant D by applying a temperature change to the bag body portion 330 is showed.

Figure 17:
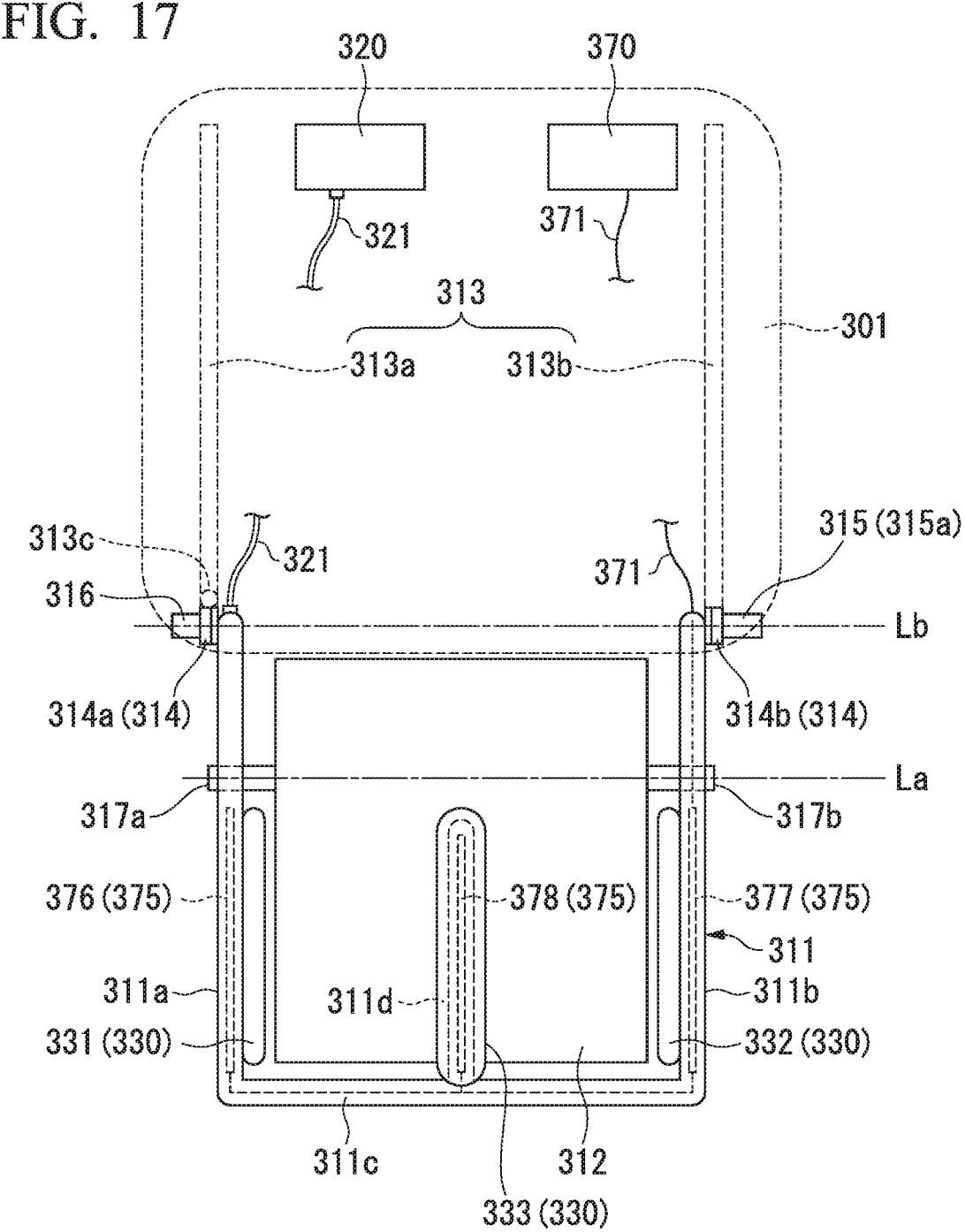
FIG. 17 is a diagram showing a configuration of a seat device 380 according to a third embodiment.

FIG. 17 is a diagram showing a configuration of a seat device 380 according to the third embodiment. The seat device 380 further includes, for example, a heat source unit 375 and a heat source control unit 370, as compared with the seat device 350 of the second embodiment. The heat source unit 375 is a heater configured of, for example, a nichrome wire. The heat source unit 375 includes a first heater 376 provided in the vertical frame 311a, a second heater 377 provided in the vertical frame 311b, and a third heater 378 provided in the support pipe 311d.

The heat source unit 375 may generate, for example, heat by generating an eddy current in the metallic frame body 311 using an electromagnetic coil, in addition to the nichrome wire. However, for the heat source unit 375, a heat source unit having a shape that does not obstruct a flow of the fluid f in the frame body 311 is used.

The heat source unit 375 is connected to the heat source control unit 370 via a wire 371. The heat source unit 375 is temperature-adjusted by the heat source control unit 370. The heat source control unit 370 includes a control circuit that adjusts a temperature of the heat source unit 375, and is controlled by the seat control unit 160. The heat source control unit 370 is arranged on, for example, the floor surface F below the seating portion 301.

Figure 18:
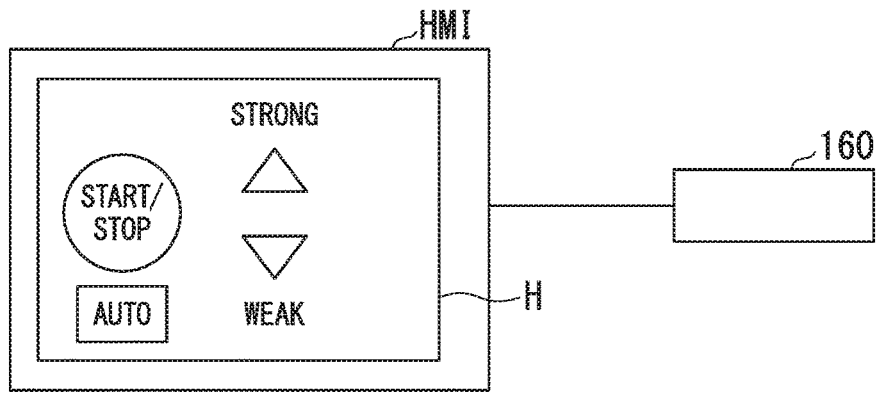
FIG. 18 is a diagram showing an operation screen H that is displayed on the HMI 30 in order to adjust a temperature of a heat source unit 375.

The temperature of the heat source unit 375, for example, may be changed by the occupant D via an operation screen that is displayed on the HMI 30. FIG. 18 is a diagram showing an operation screen H that is displayed on the HMI 30 in order to adjust the temperature of the heat source unit 375. The temperature of the heat source unit 375 may be automatically controlled by the seat control unit 160. Further, the heat source unit 375 may be arbitrarily temperature-controlled by the occupant D using a mechanical switch provided in the heat source control unit 370.

Figure 19:
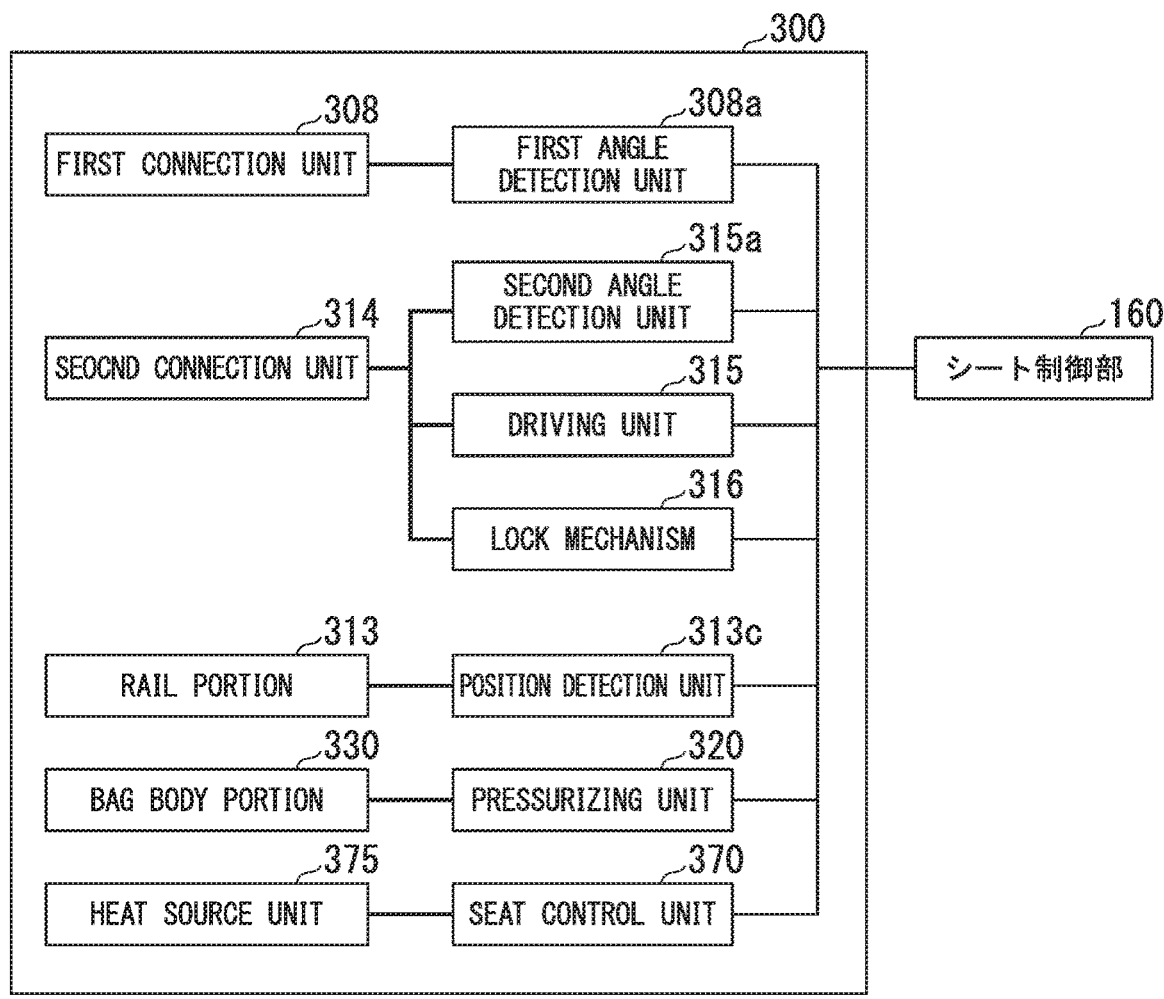
FIG. 19 is a block diagram showing a configuration of a seat control system according to a third embodiment.

FIG. 19 is a block diagram showing a configuration of a seat control system 44 according to the third embodiment. In the configuration of the seat control system 44, the heat source unit 375 and the heat source control unit 370 are added to the configuration of the seat control system 42 of the second embodiment.

The seat control unit 160 controls the pressurizing unit 320 to inflate the bag body portion 330, and then, causes the HMI 30 to display the operation screen H for adjusting the temperature. The seat control unit 160 controls the heat source control unit 370 on the basis of the operation of the operation screen H performed by the occupant D to change the temperature of the heat source unit 375. Accordingly, the temperature of the fluid f inside the bag body portion 330 changes, and the comfort of the occupant D is improved.

Figure 20:
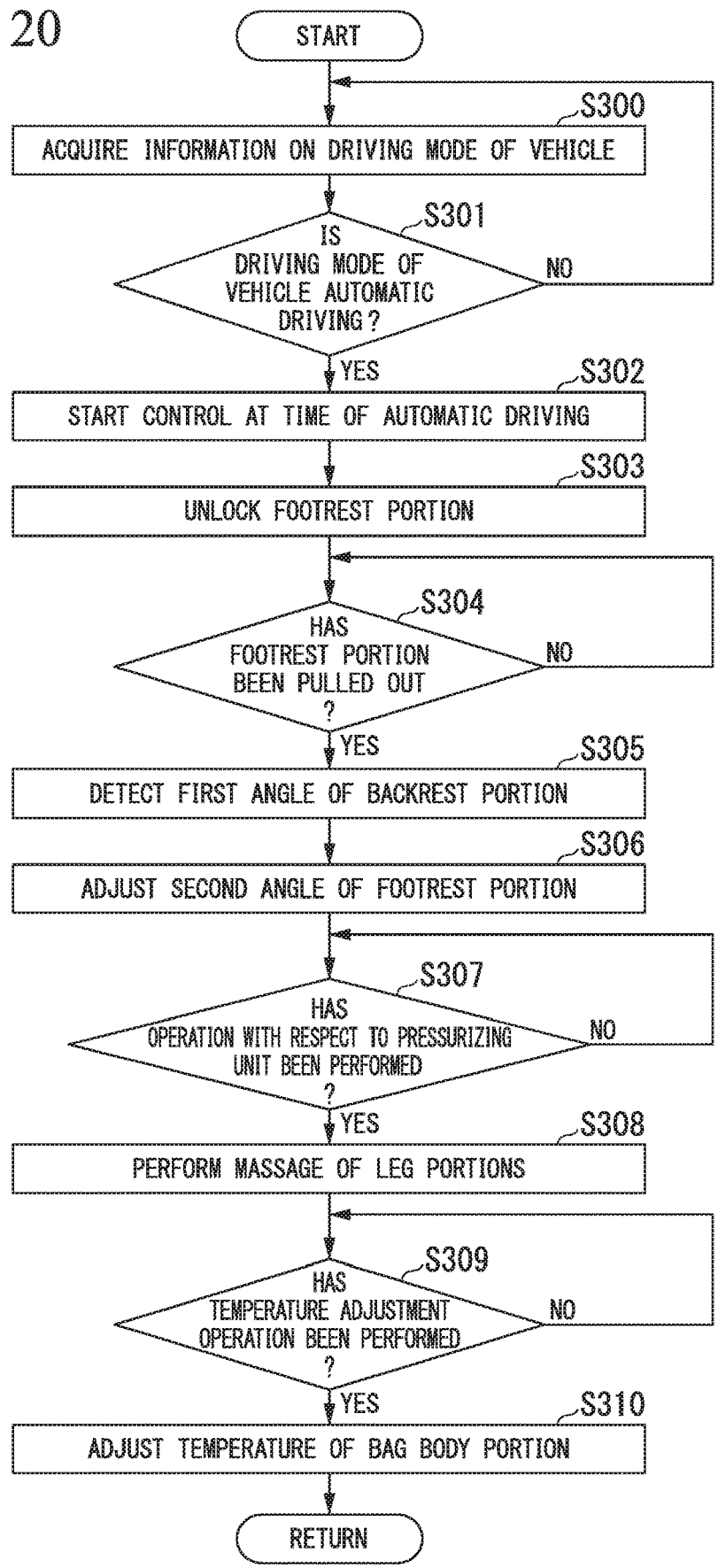
FIG. 20 is a flowchart showing a flow of a process that is performed by a seat control unit 160.

FIG. 20 is a flowchart showing a flow of a process that is performed by the seat control unit 160. Steps S300 to S308 are the same as in the second embodiment. Here, steps S309 and S310 are added. Hereinafter, description of the same process as in the second embodiment will be appropriately omitted.

The seat control unit 160 controls the bag body portion 330 (step S308), and then, determines whether or not an operation with respect to the heat source unit 375 has been performed through the operation screen H displayed on the HMI 30 (step S309). In a case that a positive determination is obtained in step S309, the seat control unit 160 controls the heat source control unit 370 on the basis of an operation selected on the operation screen H to perform adjustment of the temperature of the heat source unit 375 and adjust the temperature of the bag body portion 330 (step S310). Thereafter, the seat control unit 160 ends the process of the flowchart. In a case that a negative determination is obtained in step S309, the seat control unit 160 causes the process to return to step S309.

According to the seat control system 44 of the third embodiment described above, the temperature of the bag body portion 330 can be adjusted, and the comfort of the occupant D can be improved.

According to the vehicle seat control system, the vehicle seat control method, and the storage medium in the above-described embodiment, in a case that the occupant D causes the seat to enter the reclining state during the automatic driving of the vehicle M, it is possible to improve comfort of the occupant D by performing the control regarding the footrest portion 310.

Although the embodiments for carrying out the present invention have been described above by way of embodiments, the present invention is not limited to these embodiments at all, and various modifications and substitutions may be performed without departing from the scope of the present invention. For example, in the above embodiment, the case in which the bag body portion 330 is provided in the frame body 311 has been showed, but the present invention is not limited thereto, and the bag body portion may be provided on the leg support portion 312.

Figure 21:
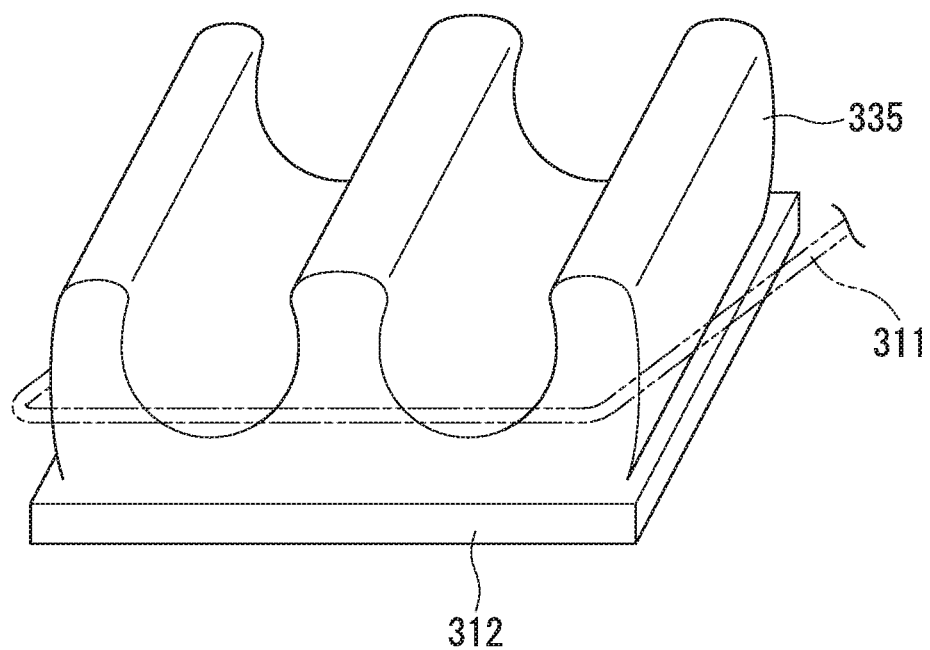
FIG. 21 is a diagram showing a modification example of the bag body portion.

FIG. 21 is a diagram showing a modification example of the bag. As showed in FIG. 21, the bag body portion 335 is provided on the leg support portion 312. In this case, the bag body portion 335 is formed in a shape that the leg portion of the occupant D is sandwiched when the bag body portion 335 is inflated. When the bag body portion 335 is contracted, the shape of the bag body portion 335 returns to a shape that does not hinder loading and unloading of the footrest portion 310. Accordingly, it is possible to simplify a configuration of the bag body portion 335.

Further, in the above embodiment, the footrest portion 310 cannot be taken out from the seating portion 301 by the lock mechanism 316 at the time of the automatic driving. However, in a case that the seat is a seat other than a seat of the driver, the footrest portion 310 may be taken out so that the footrest portion 310 can be used even at the time of manual driving, unlike the above.

While preferred embodiments of the invention have been described and showed above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle seat control system comprising:
an angle detection unit that detects an angle of a connection unit that rotatably connects a seat surface portion to a backrest portion;
a frame body that includes a pair of vertical frames and a horizontal frame connecting the pair of vertical frames to each other and is provided to be stored in the seat surface portion;
a leg support portion that includes a first rotation shaft parallel to an extending direction of the horizontal frame and is provided inside the frame body to be rotatable with respect to the frame body;
a driving unit that is provided at a proximal end of at least one of the pair of vertical frames and rotates the frame body taken out from the seat surface portion around a second rotation shaft parallel to the extending direction of the horizontal frame; and
a control unit that controls the driving unit on a basis of a detection result of the angle detection unit at least at a time of automatic driving of a vehicle,
wherein the second rotation shaft is provided at proximal ends of the pair of vertical frames, and
a pair of rotation connection units are provided on side surfaces of the leg support portion and the pair of rotation connection units rotate the leg support portion relative to the frame body around the first rotation shaft.

2. The vehicle seat control system according to claim 1, further comprising:
a bag body portion that is attached to any one of the inside of the frame body and a top surface of the leg support portion and is inflatable into a shape that sandwiches a leg portion of an occupant; and
a pressurizing unit that inflates the bag body portion with a fluid,
wherein the control unit operates the pressurizing unit at the time of automatic driving of the vehicle.

3. The vehicle seat control system according to claim 2, wherein the frame body is formed of a tubular member, and the fluid is flowed into the bag body portion through an inside of the tubular member.

4. The vehicle seat control system according to claim 2, wherein the control unit changes a control aspect of the pressurizing unit on a basis of an operation of the occupant.

5. The vehicle seat control system according to claim 2, further comprising:
a detection unit that detects that the frame body is loaded or unloaded onto or from the seat surface portion,
wherein the control unit starts control of the driving unit and the pressurizing unit on a basis of a detection result of the detection unit.

6. The vehicle seat control system according to claim 2, further comprising:
a heat source unit that changes a temperature in the bag body portion,
wherein the control unit controls the heat source unit on a basis of an operation of an occupant to change the temperature in the bag body portion.

7. A method of controlling a vehicle seat including a frame body that includes a pair of vertical frames and a horizontal frame connecting the pair of vertical frames to each other and is provided to be stored in a seat surface portion, a leg support portion including a first rotation shaft parallel to an extending direction of the horizontal frame and provided inside the frame body to be rotatable with respect to the frame body, and a driving unit that is provided at a proximal end of at least one of the pair of vertical frames and rotates the frame body taken out from the seat surface portion around a second rotation shaft parallel to the extending direction of the horizontal frame,
wherein the second rotation shaft is provided at proximal ends of the pair of vertical frames, and
a pair of rotation connection units are provided on side surfaces of the leg support portion and the pair of rotation connection units rotate the leg support portion relative to the frame body around the first rotation shaft,
the method using an in-vehicle computer, comprising:
detect an angle of a connection unit that rotatably connects the seat surface portion to a backrest portion; and
control the driving unit on a basis of a detection result at least at a time of automatic driving of a vehicle.

8. A non-transitory computer-readable recording medium recording a vehicle seat control program causing an in-vehicle computer to, the vehicle seat including a frame body that includes a pair of vertical frames and a horizontal frame connecting the pair of vertical frames to each other and is provided to be stored in a seat surface portion, a leg support portion including a first rotation shaft parallel to an extending direction of the horizontal frame and provided inside the frame body to be rotatable with respect to the frame body, and a driving unit that is provided at a proximal end of at least one of the pair of vertical frames and rotates the frame body taken out from the seat surface portion around a second rotation shaft parallel to the extending direction of the horizontal frame,
wherein the second rotation shaft is provided at proximal ends of the pair of vertical frames, and
a pair of rotation connection units are provided on side surfaces of the leg support portion and the pair of rotation connection units rotate the leg support portion relative to the frame body around the first rotation shaft,
wherein a computer
detects an angle of a connection unit that rotatably connects the seat surface portion to a backrest portion; and
controls the driving unit on a basis of a detection result at least at a time of automatic driving of a vehicle.

* * * * *